US012762557B2

(12) United States Patent
Prabhakar et al.

(10) Patent No.: US 12,762,557 B2
(45) Date of Patent: Oct. 13, 2026

(54) METHOD, SYSTEM, AND COMPUTER PROGRAM PRODUCT FOR AUTHENTICATING DIGITAL TRANSACTIONS

(71) Applicant: Visa International Service Association, San Francisco, CA (US)

(72) Inventors: Rajagopal Prabhakar, Mumbai (IN); Pramod Mulani, Mumbai (IN); Hemanth Kumar Manoharan, Bengaluru (IN); Bama Ramasubbu, Bangalore (IN); Anandan Ethirkottai Sundararajan, Bangalore (IN); Satish Kumar Patruni, Bengaluru (IN); Punniyakotti Sabapathy, Cheyyar (IN); Sandeep Tharoor, Anjumoorthy (IN); Khushboo Agrawal, Bangalore (IN); Premvir Singh, Greater Noida West (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/832,137

(22) PCT Filed: Jan. 24, 2023

(86) PCT No.: PCT/US2023/011424
§ 371 (c)(1),
(2) Date: Jul. 23, 2024

(87) PCT Pub. No.: WO2023/141352
PCT Pub. Date: Jul. 27, 2023

(65) Prior Publication Data
US 2025/0104067 A1 Mar. 27, 2025

(30) Foreign Application Priority Data
Jan. 24, 2022 (IN) ............................ 202241003776

(51) Int. Cl.
*G06Q 20/40* (2012.01)

(52) U.S. Cl.
CPC ................................. *G06Q 20/401* (2013.01)

(58) Field of Classification Search
CPC .................................................... G06Q 20/401
See application file for complete search history.

(56) References Cited

U.S. PATENT DOCUMENTS 9,906,493 B1 2/2018 Rodgers et al.
2003/0200184 A1 10/2003 Dominguez et al.
(Continued)

FOREIGN PATENT DOCUMENTS

CN 101588244 A 11/2009
CN 105745678 A 7/2016
(Continued)

OTHER PUBLICATIONS

Arias et al., "Device Attestation: Past, Present, and Future", Department of Electrical and Computer Engineering, University of Central Florida, 2018, pp. 1-6.
(Continued)

*Primary Examiner* — Raven E Yono
(74) *Attorney, Agent, or Firm* — The Webb Law Firm

(57) ABSTRACT

Methods for authenticating digital transactions include receiving a device registration request, a device attestation response including a first token, and a selection of an authentication mode from a device. In response to receiving the device registration request and determining that the selected authentication mode is a static personal identification number (PIN) authentication mode, a device registration response is provided to the device. A first payment transaction request and an enrolment request to authenticate a second payment transaction request using the static PIN authentication mode are subsequently received from the
(Continued)

device. The device is communicated with to receive the static PIN from the device. The device is enrolled based on the static PIN. Systems and computer program products are also provided.

6 Claims, 18 Drawing Sheets

(56) References Cited

U.S. PATENT DOCUMENTS

| | | | | |
|---|---|---|---|---|
| 2007/0118745 | A1 | 5/2007 | Buer | |
| 2007/0168677 | A1 | 7/2007 | Kudo et al. | |
| 2007/0288392 | A1 | 12/2007 | Peng et al. | |
| 2009/0013181 | A1 | 1/2009 | Choi et al. | |
| 2012/0031969 | A1 | 2/2012 | Hammad | |
| 2012/0150748 | A1 | 6/2012 | Law et al. | |
| 2012/0150750 | A1 | 6/2012 | Law et al. | |
| 2013/0073463 | A1* | 3/2013 | Dimmick | G06F 21/34 726/3 |
| 2013/0159195 | A1 | 6/2013 | Kirillin et al. | |
| 2013/0317989 | A1 | 11/2013 | Fisher et al. | |
| 2014/0032920 | A1 | 1/2014 | Gehrmann et al. | |
| 2014/0066015 | A1 | 3/2014 | Aissi | |
| 2015/0120560 | A1* | 4/2015 | Fisher | G06Q 20/34 705/44 |
| 2016/0086150 | A1 | 3/2016 | Gomi et al. | |
| 2016/0224966 | A1 | 8/2016 | Van Os et al. | |
| 2016/0224973 | A1 | 8/2016 | Van Os et al. | |
| 2016/0275461 | A1 | 9/2016 | Sprague et al. | |
| 2017/0061419 | A1 | 3/2017 | Kim et al. | |
| 2017/0286965 | A1 | 10/2017 | Erwin et al. | |
| 2017/0300904 | A1 | 10/2017 | Chung et al. | |
| 2018/0047023 | A1 | 2/2018 | Bouda | |
| 2018/0254898 | A1 | 9/2018 | Sprague et al. | |
| 2018/0336559 | A1 | 11/2018 | Shah et al. | |
| 2018/0349909 | A1 | 12/2018 | Allen | |
| 2018/0359244 | A1 | 12/2018 | Cockerill | |
| 2019/0199530 | A1 | 6/2019 | Reitsma | |
| 2019/0222576 | A1* | 7/2019 | Borkar | H04L 63/0884 |
| 2020/0394640 | A1* | 12/2020 | Ghosh | G06Q 20/3674 |
| 2021/0304319 | A1* | 9/2021 | Davis | G06Q 50/188 |
| 2021/0357901 | A1 | 11/2021 | Ghosh et al. | |

FOREIGN PATENT DOCUMENTS

| | | | |
|---|---|---|---|
| CN | 106465112 | A | 2/2017 |
| EP | 03035269 | A1 | 6/2016 |
| JP | 2013054536 | A | 3/2013 |
| JP | 2016062413 | A | 4/2016 |
| JP | 2016524244 | A | 8/2016 |
| JP | 2018005675 | A | 1/2018 |
| JP | 2018507460 | A | 3/2018 |
| RU | 2388053 | C1 | 4/2010 |

OTHER PUBLICATIONS

Bare, “Attestation and Trusted Computing”, CSEP 590: Practical Aspects of Modern Cryptography, 2006, pp. 1-10.

Berbecaru, “Lrap: A location-based remote client authentication protocol for mobile environments”, 19th International Euromicro Conference on Parallel, Distributed and Network-Based Processing, 2011, pp. 141-145.

Filyanov et al., “Uni-directional trusted path: Transaction confirmation on just one device”, IEEE, 2011, pp. 1-12.

“Implicit Identity Based Device Attestation”, TCG, 2018, pp. 1-18.

Reimair et al., “Emulating U2F Authenticator Devices”, The 2nd IEEE Workshop on Security and Privacy in the Cloud, 2016, pp. 1-9.

Shahin et al., “Hybrid slotted-CSMA/CA-TDMA for efficient massive registration of IoT devices”, IEEE Access, 2018, pp. 18366-18382, vol. 6. Retrieved on May 19, 2023 from <https://ieeexplore.ieee.org/abstract/document/8316811>.

* cited by examiner

401

```
{
"timestamp": 9860437986543,
"nonce": "R2Rra24fVm5xa2Mg",
"PackageName": "com.package.name.of.requesting.app",
"CertificateDigestSha256": ["base64 encoded, SHA-256 hash of the
certificate used to sign requesting app"],
"ProfileMatch": true,
"Integrity": true,
}
```

FIGURE 4A

402

| Device Status | Value of ProfileMatch | Value of Integrity |
|---|---|---|
| Certified and genuine device | TRUE | TRUE |
| Certified device | FALSE | TRUE |
| Genuine but uncertified device, | FALSE | TRUE |
| Device with custom ROM | FALSE | TRUE |
| Emulator | FALSE | FALSE |
| No device | FALSE | FALSE |
| Signs of integrity compromised | FALSE | FALSE |
| Signs of other active attacks | FALSE | FALSE |

FIGURE 4B

601

| | 1st Authentication Technique | 2nd Authentication Technique | 3rd Authentication Technique | 4th Authentication Technique |
|---|---|---|---|---|
| Issuer A | ✓ | ✓ | ✓ | ✓ |
| Issuer B | ✓ | ✓ | ✗ | ✓ |
| Issuer C | ✗ | ✗ | ✓ | ✓ |

FIGURE 6A

602

| | 1st Authentication Technique | 2nd Authentication Technique | 3rd Authentication Technique | 4th Authentication Technique |
|---|---|---|---|---|
| Issuer A | 1 | 3 | 2 | 4 |
| Issuer B | 2 | 1 | ✕ | 3 |
| Issuer C | ✕ | ✕ | 1 | 2 |

FIGURE 6B

603

| | 1st Authentication Technique | 2nd Authentication Technique | 3rd Authentication Technique | 4th Authentication Technique |
|---|---|---|---|---|
| Issuer A | ✓ | ✓ | ✗ | ✓ |
| Issuer B | ✓ | ✓ | ✗ | ✓ |
| Issuer C | ✗ | ✗ | ✓ | ✓ |

FIGURE 6C

METHOD, SYSTEM, AND COMPUTER PROGRAM PRODUCT FOR AUTHENTICATING DIGITAL TRANSACTIONS

CROSS REFERENCE TO RELATED APPLICATIONS

This application is the United States national phase of International Patent Application No. PCT/US23/11424 filed on Jan. 24, 2023, and claims the benefit of Indian Provisional Patent Application No. 202241003776, filed on Jan. 24, 2022, the disclosures of which are hereby incorporated by reference in their entireties.

BACKGROUND

1. Technical Field

The present disclosure relates to authentication of digital transactions. Particularly, but not exclusively, the present disclosure relates to a method and system for device enrolment and network-based authentication of digital transactions.

2. Technical Considerations

Recent trends indicate a drastic increase in mobile application based online payments (e.g., digital transactions) using smartphones. The online payments include card-on-file payments, Unified Payments Interface (UPI), net banking, and the like. For the card-on-file payments, one or more details of a payment card of a user are stored by a mobile application and the one or more details are used for initiating the digital transactions. The digital transactions are authenticated using one or more issuer authentication modes, for example, a 3-D secure model. Alternatively, for payment transactions at a point of sale machine using a physical payment card, the user can initiate a network-based authentication. The network-based authentication eliminates the need for a Personal Identification Number (PIN), a password, and a One Time Password (OTP) for authenticating the payment transactions. The network-based authentication requires less time as compared with the one or more issuer authentication modes and provides a higher payment success rate to the user.

An issue with the existing techniques is the lack of network-based authentication modes for the online payments including the card-on-file payments. Further, the existing techniques lack a secure mechanism for initiating and processing the card-on-file payments because the network-based authentication modes do not require a second factor authentication, for example, a PIN.

Additionally, while some users may prefer performing payments (e.g., card-on-file payments) without a second factor authentication, other users may be hesitant to trust a payment flow that does not include second factor authentication. Another issue with existing techniques is a lack of scalability and flexibility to select an application or a software development kit (SDK) from one payment facilitator that would be preferable to another. Further, existing techniques limited to online payments through mobile applications may result in a lack of flexibility to extend the framework to different methods of payment.

SUMMARY

Additional features and advantages are realized through the techniques of the present disclosure. Other embodiments and aspects of the disclosure are described in detail herein and are considered a part of the claimed disclosure.

A computer-implemented method, comprising: receiving, by at least one processor, a device registration request, a device attestation response comprising a first token, and a selection of an authentication mode of a plurality of authentication modes from a device, wherein the first token is sent by a first server to a second server, and wherein, in response to receiving the first token from the first server, the second server sends device information to the first server, wherein the plurality of authentication modes comprises at least one second factor authentication mode. In some non-limiting embodiments or aspects, the method may further comprise determining, by the at least one processor, the authentication mode is one of the at least one second factor authentication mode based on the selection of the authentication mode of the plurality of authentication modes. In some non-limiting embodiments or aspects, the method may further comprise in response to receiving the device registration request and determining that the authentication mode is the one of the at least one second factor authentication mode, providing, by the at least one processor, a device registration response to the device, wherein the device registration response is stored on the device. In some non-limiting embodiments or aspects, the method may further comprise receiving, by the at least one processor, a first payment transaction request and an enrolment request to authenticate a second payment transaction request using the one of the at least one second factor authentication mode from the device. In some non-limiting embodiments or aspects, the method may further comprise communicating, by the at least one processor, with the device to receive second factor authentication data from the device. In some non-limiting embodiments or aspects, the method may further comprise enrolling, by the at least one processor, the device based on the second factor authentication data. In some non-limiting embodiments or aspects, communicating with the device to receive the second factor authentication data may further comprise providing, by the at least one processor, a second token and a second factor authentication uniform resource locator (URL) to the device, wherein the second factor authentication URL redirects the device to a webpage at the second factor authentication URL, wherein the webpage prompts a user of the device to set the second factor authentication data, wherein the second factor authentication data is used for repeat transactions; and receiving, by the at least one processor, the second factor authentication data set by the user of the device, and wherein enrolling the device based on the second factor authentication data comprises: associating, by the at least one processor, the second factor authentication data with a payment account of the user; and providing, by the at least one processor, a third token to the device. In some non-limiting embodiments or aspects, providing the third token may comprise: updating, by the at least one processor, a state of the second token; and generating, by the at least one processor, the third token based on the second token, wherein the third token is used to authenticate the second payment transaction request. In some non-limiting embodiments or aspects, the method may further comprise associating, by the at least one processor, the third token with the second factor authentication data. In some non-limiting embodiments or aspects, the at least one second factor authentication mode comprises a static PIN authentication mode, wherein determining the authentication mode is one of the at least one second factor authentication mode comprises determining the authentication mode is the static PIN authentication mode based on the selection of the authentication mode of the plurality of authentication modes, wherein the enrolment request to authenticate the second payment transaction request using the one of the at least one second factor authentication mode comprising a first enrolment request to authenticate the second payment transaction request using the static PIN authentication mode, wherein communicating with the device to receive the second factor authentication data comprises communicating with the device to receive a static PIN, and wherein enrolling the device comprises enrolling the device based on the static PIN.

In some non-limiting embodiments or aspects, provided is a system, the system comprising at least one processor, the at least one processor programmed or configured to: receive a device registration request, a device attestation response comprising a first token, and a selection of an authentication mode of a plurality of authentication modes from a device, wherein the first token is sent by a first server to a second server, and wherein, in response to receiving the first token from the first server, the second server sends device information to the first server, wherein the plurality of authentication modes comprise at least one second factor authentication mode. In some non-limiting embodiments or aspects, the at least one processor may be further programmed or configured to determine the authentication mode is one of the at least one second factor authentication mode based on the selection of the authentication mode of the plurality of authentication modes. In some non-limiting embodiments or aspects, the at least one processor may be further programmed or configured to, in response to receiving the device registration request and determining that the authentication mode is the one of the at least one second factor authentication mode, provide a device registration response to the device, wherein the device registration response is stored on the device. In some non-limiting embodiments or aspects, the at least one processor may be further programmed or configured to receive a first payment transaction request and an enrolment request to authenticate a second payment transaction request using the one of the at least one second factor authentication modes from the device. In some non-limiting embodiments or aspects, the at least one processor may be further programmed or configured to communicate with the device to receive second factor authentication data from the device. In some non-limiting embodiments or aspects, the at least one processor may be further programmed or configured to enroll the device based on the second factor authentication data. In some non-limiting embodiments or aspects, when communicating with the device to receive the second factor authentication data, the at least one processor may be further programmed or configured to: provide a second token and a second factor authentication URL to the device, wherein the second factor authentication URL redirects the device to a webpage at the second factor authentication URL, wherein the webpage prompts a user of the device to set the second factor authentication data, wherein the second factor authentication data is used for repeat transactions; and receive the second factor authentication data set by the user of the device, and wherein, when enrolling the device based on the second factor authentication data, the at least one processor is programmed or configured to: associate the second factor authentication data with a payment account of the user; and provide a third token to the device. In some non-limiting embodiments or aspects, when providing the third token, the at least one processor may be programmed or configured to: update a state of the second token; and generate the third token based on the second token, wherein the third token is used to authenticate the second payment transaction request. In some non-limiting embodiments or aspects, the at least one processor may be further programmed or configured to: associate the third token with the second factor authentication data. In some non-limiting embodiments or aspects, the at least one second factor authentication mode may include a static PIN authentication mode, wherein, when determining the authentication mode is one of the at least one second factor authentication modes, the at least one processor is programmed or configured to determine the authentication mode is the static PIN authentication mode based on the selection of the authentication mode of the plurality of authentication modes, wherein the enrolment request to authenticate the second payment transaction request using the one of the at least one second factor authentication mode may include a first enrolment request to authenticate the second payment transaction request using the static PIN authentication mode, wherein, when communicating with the device to receive the second factor authentication data, the at least one processor may be further programmed or configured to communicate with the device to receive a static PIN, and wherein, when enrolling the device, the at least one processor may be further programmed or configured to enroll the device based on the static PIN.

In some non-limiting embodiments or aspects, provided is computer program product comprising at least one non-transitory computer readable medium comprising one or more instructions that, when executed, cause at least one processor to: receive a device registration request, a device attestation response comprising a first token, and a selection of an authentication mode of a plurality of authentication modes from a device, wherein the first token is sent by a first server to a second server, and wherein, in response to receiving the first token from the first server, the second server sends device information to the first server, wherein the plurality of authentication modes comprises at least one second factor authentication mode. In some non-limiting embodiments or aspects, the one or more instructions may further cause the at least one processor to determine the authentication mode is one of the at least one second factor authentication modes based on the selection of the authentication mode of the plurality of authentication modes. In some non-limiting embodiments or aspects, the one or more instructions may further cause the at least one processor to, in response to receiving the device registration request and determining that the authentication mode is the one of the at least one second factor authentication modes, provide a device registration response to the device, wherein the device registration response is stored on the device. In some non-limiting embodiments or aspects, the one or more instructions may further cause the at least one processor to receive a first payment transaction request and an enrolment request to authenticate a second payment transaction request using the one of the at least one second factor authentication modes from the device. In some non-limiting embodiments or aspects, the one or more instructions may further cause the at least one processor to communicate with the device to receive second factor authentication data from the device. In some non-limiting embodiments or aspects, the one or more instructions may further cause the at least one processor to enroll the device based on the second factor authentication data.

In some non-limiting embodiments or aspects, the one or more instructions that cause the at least one processor to communicate with the device to receive the second factor authentication data, may cause the at least one processor to: provide a second token and a second factor authentication URL to the device, wherein the second factor authentication URL redirects the device to a webpage at the second factor authentication URL, wherein the webpage prompts a user of the device to set the second factor authentication data, wherein the second factor authentication data is used for repeat transactions; and receive the second factor authentication data set by the user of the device, and wherein, the one or more instructions that cause the at least one processor to enroll the device based on the second factor authentication data, cause the at least one processor to: associate the second factor authentication data with a payment account of the user; and provide a third token to the device. In some non-limiting embodiments or aspects, the one or more instructions that cause the at least one processor to provide the third token, may cause the at least one processor to: update a state of the second token; and generate the third token based on the second token, wherein the third token is used to authenticate the second payment transaction request. In some non-limiting embodiments or aspects, the one or more instructions may cause the at least one processor to: associate the third token with the second factor authentication data. In some non-limiting embodiments or aspects, the at least one second factor authentication mode may comprise a static PIN authentication mode, wherein, the one or more instructions that cause the at least one processor to determine the authentication mode is one of the at least one second factor authentication mode, cause the at least one processor to determine the authentication mode is the static PIN authentication mode based on the selection of the authentication mode of the plurality of authentication modes, wherein the enrolment request to authenticate the second payment transaction request using the one of the one of the at least one second factor authentication modes comprises a first enrolment request to authenticate the second payment transaction request using the static PIN authentication mode, wherein, the one or more instructions that cause the at least one processor to communicate with the device to receive the second factor authentication data, cause the at least one processor to communicate with the device to receive a static PIN, and wherein, the one or more instructions that cause the at least one processor to enroll the device, cause the at least one processor to enroll the device based on the static PIN.

In some non-limiting embodiments or aspects, provided is a computer-implemented method comprising: receiving, by at least one processor, a selection of an application of a first payment facilitator of a plurality of payment facilitators and a first account identifier of at least one account identifier associated with the payment facilitator from a device. In some non-limiting embodiments or aspects, the method may further include, based on the selection, receiving, by at least one processor, a device registration request and a device attestation response including a token from the application of the first payment facilitator of the plurality of payment facilitators, wherein the token is sent by a first server to a second server, and wherein, in response to receiving the token from the first server, the second server sends device information to the first server. In some non-limiting embodiments or aspects, the method may further include, in response to the device registration request, providing, by the at least one processor, a device registration response to the application of the first payment facilitator of the plurality of payment facilitators, wherein the device registration response is stored by the application of the first payment facilitator of the plurality of payment facilitators. In some non-limiting embodiments or aspects, the method may further include receiving, by the at least one processor from the application of the first payment facilitator of the plurality of payment facilitators, a first payment transaction request and an enrolment request to authenticate a second payment transaction request using a first type of authentication mode. In some non-limiting embodiments or aspects, the method may further include enrolling, by the at least one processor, the application of the first payment facilitator of the plurality of payment facilitators to the first type of authentication mode and providing a cryptogram to the application of the first payment facilitator of the plurality of payment facilitators based on a result of the first payment transaction request, wherein the cryptogram is used for authenticating the second payment transaction request.

In some non-limiting embodiments or aspects, the method may further comprise generating, by the at least one processor, the token, wherein the token comprises a plurality of token features, and wherein the plurality of token features comprise at least a token owner identifier; and setting, by the at least one processor, the token owner identifier of the token to match an identifier associated with the first payment facilitator of the plurality of payment facilitators. In some non-limiting embodiments or aspects, after setting the token owner identifier to match the identifier associated with the first payment facilitator of the plurality of payment facilitators, the token can only be used by the application of the first payment facilitator of the plurality of payment facilitators. In some non-limiting embodiments or aspects, the method may further comprise generating, by the at least one processor, a private key and a public key, wherein the private key is stored by the application of the first payment facilitator of the plurality of payment facilitators on the first server, and wherein the public key is stored by an issuer on an issuer server. In some non-limiting embodiments or aspects, providing the cryptogram may comprise generating, by the at least one processor, the cryptogram based on the private key, wherein the cryptogram is signed by the first payment facilitator of the plurality of payment facilitators. In some non-limiting embodiment or aspects, authenticating the second payment transaction request may comprise verifying, by the at least one processor, that the token owner identifier of the token matches an identifier associated with the first payment facilitator of the plurality of payment facilitators based on the cryptogram; and authenticating, by the at least one processor, the second payment transaction request based on the cryptogram.

In some non-limiting embodiments or aspects, provided is a system comprising at least one processor, the at least one processor programmed or configured to: receive a selection of an application of a first payment facilitator of a plurality of payment facilitators and a first account identifier of at least one account identifier associated with the payment facilitator from a device. In some non-limiting embodiments or aspects, the at least one processor may be further programmed or configured to, based on the selection, receive a device registration request and a device attestation response including a token from the application of the first payment facilitator of the plurality of payment facilitators, wherein the token is sent by a first server to a second server, and wherein, in response to receiving the token from the first server, the second server sends device information to the first server. In some non-limiting embodiments or aspects, the at least one processor may be further programmed or configured to, in response to the device registration request, provide a device registration response to the application of the first payment facilitator of the plurality of payment facilitators, wherein the device registration response is stored by the application of the first payment facilitator of the plurality of payment facilitators. In some non-limiting embodiments or aspects, the at least one processor may be further programmed or configured to receive from the application of the first payment facilitator of the plurality of payment facilitators, a first payment transaction request and an enrolment request to authenticate a second payment transaction request using a first type of authentication mode. In some non-limiting embodiments or aspects, the at least one processor may be further programmed or configured to enroll the application of the first payment facilitator of the plurality of payment facilitators to the first type of authentication mode and provide a cryptogram to the application of the first payment facilitator of the plurality of payment facilitators based on a result of the first payment transaction request, wherein the cryptogram is used for authenticating the second payment transaction request.

In some non-limiting embodiments or aspects, the at least one processor may be further programmed or configured to: generate the token, wherein the token comprises a plurality of token features, and wherein the plurality of token features comprise at least a token owner identifier; and set the token owner identifier of the token to match an identifier associated with the first payment facilitator of the plurality of payment facilitators. In some non-limiting embodiments or aspects, after setting the token owner identifier to match the identifier associated with the first payment facilitator of the plurality of payment facilitators, the token can only be used by the application of the first payment facilitator of the plurality of payment facilitators. In some non-limiting embodiments or aspects, the at least one processor is programmed or configured to: generate a private key and a public key, wherein the private key is stored by the application of the first payment facilitator of the plurality of payment facilitators on the first server, and wherein the public key is stored by an issuer on an issuer server. In some non-limiting embodiments or aspects, when providing the cryptogram, the at least one processor may be further programmed or configured to: generate the cryptogram based on the private key, wherein the cryptogram is signed by the first payment facilitator of the plurality of payment facilitators. In some non-limiting embodiments or aspects, when authenticating the second payment transaction request, the at least one processor may be further programmed or configured to: verify that the token owner identifier of the token matches an identifier associated with the first payment facilitator of the plurality of payment facilitators based on the cryptogram; and authenticate the second payment transaction request based on the cryptogram.

In some non-limiting embodiments or aspects, provided is a computer program product comprising at least one non-transitory computer readable medium comprising one or more instructions that, when executed by at least one processor, cause the at least one processor to: receive a selection of an application of a first payment facilitator of a plurality of payment facilitators and a first account identifier of at least one account identifier associated with the payment facilitator from a device; based on the selection, receive a device registration request and a device attestation response including a token from the application of the first payment facilitator of the plurality of payment facilitators, wherein the token is sent by a first server to a second server, and wherein, in response to receiving the token from the first server, the second server sends device information to the first server; in response to the device registration request, provide a device registration response to the application of the first payment facilitator of the plurality of payment facilitators, wherein the device registration response is stored by the application of the first payment facilitator of the plurality of payment facilitators; receive from the application of the first payment facilitator of the plurality of payment facilitators, a first payment transaction request and an enrolment request to authenticate a second payment transaction request using a first type of authentication mode; and enroll the application of the first payment facilitator of the plurality of payment facilitators to the first type of authentication mode and provide a cryptogram to the application of the first payment facilitator of the plurality of payment facilitators based on a result of the first payment transaction request, wherein the cryptogram is used for authenticating the second payment transaction request.

In some non-limiting embodiments or aspects, the one or more instructions may further cause the at least one processor to: generate the token, wherein the token comprises a plurality of token features, and wherein the plurality of token features comprise at least a token owner identifier; and set the token owner identifier of the token to match an identifier associated with the first payment facilitator of the plurality of payment facilitators. In some non-limiting embodiment or aspects, after setting the token owner identifier to match the identifier associated with the first payment facilitator of the plurality of payment facilitators, the token can only be used by the application of the first payment facilitator of the plurality of payment facilitators. In some non-limiting embodiments or aspects, the one or more instructions may further cause the at least one processor to: generate a private key and a public key, wherein the private key is stored by the application of the first payment facilitator of the plurality of payment facilitators on the first server, and wherein the public key is stored by an issuer on an issuer server. In some non-limiting embodiments or aspects, the one or more instructions that cause the at least one processor to provide the cryptogram, may further cause the at least one processor to: generate the cryptogram based on the private key, wherein the cryptogram is signed by the first payment facilitator of the plurality of payment facilitators. In some non-limiting embodiments or aspects, the one or more instructions that cause the at least one processor to authenticate the second payment transaction request, may further cause the at least one processor to: verify that the token owner identifier of the token matches an identifier associated with the first payment facilitator of the plurality of payment facilitators based on the cryptogram; and authenticate the second payment transaction request based on the cryptogram.

In some non-limiting embodiments or aspects, provided is a computer-implemented method comprising: receiving, by at least one processor, a device registration request and a device attestation response including a first token from a device, wherein the first token is sent by a first server to a second server, and wherein, in response to receiving the first token from the first server, the second server sends device information to the first server; in response to the device registration request, providing, by the at least one processor, a device registration response to the device, wherein the device registration response is stored on the device; in response to the device scanning a quick response (QR) code by a QR code scanning application on the device, receiving, by the at least one processor from the device, a first payment transaction request based on the QR code and an enrolment request to authenticate a second payment transaction request using a first type of authentication mode; and enrolling, by the at least one processor, the device to the first type of authentication mode and providing a second token to the device based on a result of the first payment transaction request, wherein the second token is used for authenticating the second payment transaction request initiated in response to the device scanning a second QR code by the QR code scanning application.

In some non-limiting embodiment or aspects, when authenticating the second payment transaction request the method may further comprise: in response to the device scanning the second QR code by the QR code scanning application, receiving, by the at least one processor from the device, the second payment transaction request based on the second QR code; in response to receiving the second payment transaction request, communicating, by the at least one processor, with an authentication server based on the second token; receiving, by the at least one processor, an account identifier associated with the second token from the authentication sever; and processing, by the at least one processor, the second payment transaction request based on the account identifier. In some non-limiting embodiments or aspects, the authentication server communicates the account identifier without additional communications.

In some non-limiting embodiments or aspects, provided is a system comprising at least one processor, the processor programmed or configured to: receive a device registration request and a device attestation response including a first token from a device, wherein the first token is sent by a first server to a second server, and wherein, in response to receiving the first token from the first server, the second server sends device information to the first server; in response to the device registration request, provide a device registration response to the device, wherein the device registration response is stored on the device; in response to the device scanning a QR code by a QR code scanning application on the device, receive a first payment transaction request based on the QR code and an enrolment request to authenticate a second payment transaction request using a first type of authentication mode; and enroll the device to the first type of authentication mode and providing a second token to the device based on a result of the first payment transaction request, wherein the second token is used for authenticating the second payment transaction request initiated in response to the device scanning a second QR code by the QR code scanning application.

In some non-limiting embodiments or aspects, when authenticating the second payment transaction request, the at least one processor may be further programmed or configured to: in response to the device scanning the second QR code by the QR code scanning application, receive, from the device, the second payment transaction request based on the second QR code; in response to receiving the second payment transaction request, communicate with an authentication server based on the second token; receive an account identifier associated with the second token from the authentication sever; and process the second payment transaction request based on the account identifier. In some non-limiting embodiments or aspects, the authentication server communicates the account identifier without additional communications.

In some non-limiting embodiments or aspects, provided is a computer program product comprising at least one non-transitory computer readable medium comprising one or more instructions that, when executed by at least one processor, cause the at least one processor to: receive a device registration request and a device attestation response including a first token from a device, wherein the first token is sent by a first server to a second server, and wherein, in response to receiving the first token from the first server, the second server sends device information to the first server; in response to the device registration request, provide a device registration response to the device, wherein the device registration response is stored on the device; in response to the device scanning a QR code by a QR code scanning application on the device, receive a first payment transaction request based on the QR code and an enrolment request to authenticate a second payment transaction request using a first type of authentication mode; and enroll the device to the first type of authentication mode and providing a second token to the device based on a result of the first payment transaction request, wherein the second token is used for authenticating the second payment transaction request initiated in response to the device scanning a second QR code by the QR code scanning application.

In some non-limiting embodiments or aspects, the one or more instructions that cause the at least one processor to authenticate the second payment transaction request, may further cause the at least one processor to: in response to the device scanning the second QR code by the QR code scanning application, receive, from the device, the second payment transaction request based on the second QR code; in response to receiving the second payment transaction request, communicate with an authentication server based on the second token; receive an account identifier associated with the second token from the authentication sever; and process the second payment transaction request based on the account identifier. In some non-limiting embodiments or aspects, the authentication server communicates the account identifier without additional communications.

Further non-limiting embodiments or aspects are set forth in the following numbered clauses.

Clause 1: A computer-implemented method, comprising: receiving, by at least one processor, a device registration request, a device attestation response comprising a first token, and a selection of an authentication mode of a plurality of authentication modes from a device, wherein the first token is sent by a first server to a second server, and wherein, in response to receiving the first token from the first server, the second server sends device information to the first server, wherein the plurality of authentication modes comprises at least one second factor authentication mode; determining, by the at least one processor, the authentication mode is one of the at least one second factor authentication modes based on the selection of the authentication mode of the plurality of authentication modes; in response to receiving the device registration request and determining that the authentication mode is the one of the at least one second factor authentication mode, providing, by the at least one processor, a device registration response to the device, wherein the device registration response is stored on the device; receiving, by the at least one processor, a first payment transaction request and an enrolment request to authenticate a second payment transaction request using the one of the at least one second factor authentication mode from the device; communicating, by the at least one processor, with the device to receive second factor authentication data from the device; and enrolling, by the at least one processor, the device based on the second factor authentication data.

Clause 2: The computer-implemented method of clause 1, wherein communicating with the device to receive the second factor authentication data comprises: providing, by the at least one processor, a second token and a second factor authentication URL to the device, wherein the second factor authentication URL redirects the device to a webpage at the second factor authentication URL, wherein the webpage prompts a user of the device to set the second factor authentication data, wherein the second factor authentication data is used for repeat transactions; and receiving, by the at least one processor, the second factor authentication data set by the user of the device, and wherein enrolling the device based on the second factor authentication data comprises: associating, by the at least one processor, the second factor authentication data with a payment account of the user; and providing, by the at least one processor, a third token to the device.

Clause 3: The computer-implemented method of clause 1 or 2, wherein providing the third token comprises: updating, by the at least one processor, a state of the second token; and generating, by the at least one processor, the third token based on the second token, wherein the third token is used to authenticate the second payment transaction request.

Clause 4: The computer-implemented method of any of clauses 1-3, further comprising: associating, by the at least one processor, the third token with the second factor authentication data.

Clause 5: The computer-implemented method of any of clauses 1-4, wherein the at least one second factor authentication mode comprises a static personal identification number (PIN) authentication mode, wherein determining the authentication mode is one of the at least one second factor authentication mode, comprises determining the authentication mode is the static PIN authentication mode based on the selection of the authentication mode of the plurality of authentication modes, wherein the enrolment request to authenticate the second payment transaction request using the one of the at least one second factor authentication mode comprises a first enrolment request to authenticate the second payment transaction request using the static PIN authentication mode, wherein communicating with the device to receive the second factor authentication data comprises communicating with the device to receive a static PIN, and wherein enrolling the device comprises enrolling the device based on the static PIN.

Clause 6: A system comprising at least one processor, the at least one processor programmed or configured to: receive a device registration request, a device attestation response comprising a first token, and a selection of an authentication mode of a plurality of authentication modes from a device, wherein the first token is sent by a first server to a second server, and wherein, in response to receiving the first token from the first server, the second server sends device information to the first server, wherein the plurality of authentication modes comprises at least one second factor authentication mode; determine the authentication mode is one of the at least one second factor authentication mode based on the selection of the authentication mode of the plurality of authentication modes; in response to receiving the device registration request and determining that the authentication mode is the one of the at least one second factor authentication mode, provide a device registration response to the device, wherein the device registration response is stored on the device; receive a first payment transaction request and an enrolment request to authenticate a second payment transaction request using the one of the at least one second factor authentication mode from the device; communicate with the device to receive second factor authentication data from the device; and enroll the device based on the second factor authentication data.

Clause 7: The system of clause 6, wherein, when communicating with the device to receive the second factor authentication data, the at least one processor is further programmed or configured to: provide a second token and a second factor authentication uniform resource locator (URL) to the device, wherein the second factor authentication URL redirects the device to a webpage at the second factor authentication URL, wherein the webpage prompts a user of the device to set the second factor authentication data, wherein the second factor authentication data is used for repeat transactions; and receive the second factor authentication data set by the user of the device, and wherein, when enrolling the device based on the second factor authentication data, the at least one processor is programmed or configure to: associate the second factor authentication data with a payment account of the user; and provide a third token to the device.

Clause 8: The system of clause 6 or 7, wherein, when providing the third token, the at least one processor is programmed or configured to: update a state of the second token; and generate the third token based on the second token, wherein the third token is used to authenticate the second payment transaction request.

Clause 9: The system of any one of clauses 6-8, wherein the at least one processor is further programmed or configured to: associate the third token with the second factor authentication data.

Clause 10: The system of any one of clauses 6-9, wherein the at least one second factor authentication mode comprises a static PIN authentication mode, wherein, when determining the authentication mode is one of the at least one second factor authentication modes, the at least one processor is programmed or configured to determine the authentication mode is the static PIN authentication mode based on the selection of the authentication mode of the plurality of authentication modes, wherein the enrolment request to authenticate the second payment transaction request using the one of the at least one second factor authentication mode comprises a first enrolment request to authenticate the second payment transaction request using the static PIN authentication mode, wherein, when communicating with the device to receive the second factor authentication data, the at least one processor is further programmed or configured to communicate with the device to receive a static PIN, and wherein, when enrolling the device, the at least one processor is further programmed or configured to enroll the device based on the static PIN.

Clause 11: A computer program product comprising at least one non-transitory computer readable medium comprising one or more instructions that, when executed, cause at least one processor to: receive a device registration request, a device attestation response comprising a first token, and a selection of an authentication mode of a plurality of authentication modes from a device, wherein the first token is sent by a first server to a second server, and wherein, in response to receiving the first token from the first server, the second server sends device information to the first server, wherein the plurality of authentication modes comprises at least one second factor authentication mode; determine the authentication mode is one of the at least one second factor authentication mode based on the selection of the authentication mode of the plurality of authentication modes; in response to receiving the device registration request and determining that the authentication mode is the one of the at least one second factor authentication mode, provide a device registration response to the device, wherein the device registration response is stored on the device; receive a first payment transaction request and an enrolment request to authenticate a second payment transaction request using the one of the at least one second factor authentication mode from the device; communicate with the device to receive second factor authentication data from the device; and enroll the device based on the second factor authentication data.

Clause 12: The computer program product of clause 11, wherein, the one or more instructions that cause the at least one processor to communicate with the device to receive the second factor authentication data, cause the at least one processor to: provide a second token and a second factor authentication URL to the device, wherein the second factor authentication URL redirects the device to a webpage at the second factor authentication URL, wherein the webpage prompts a user of the device to set the second factor authentication data, wherein the second factor authentication data is used for repeat transactions; and receive the second factor authentication data set by the user of the device, and wherein, the one or more instructions that cause the at least one processor to enroll the device based on the second factor authentication data, cause the at least one processor to: associate the second factor authentication data with a payment account of the user; and provide a third token to the device.

Clause 13: The computer program product of clause 11 or 12, wherein, the one or more instructions that cause the at least one processor to provide the third token, cause the at least one processor to: update a state of the second token; and generate the third token based on the second token, wherein the third token is used to authenticate the second payment transaction request.

Clause 14: The computer program product of any one of clauses 11-13, wherein the one or more instructions cause the at least one processor to: associate the third token with the second factor authentication data.

Clause 15: The computer program product of any one of clauses 11-14, wherein the at least one second factor authentication mode comprises a static PIN authentication mode, wherein, the one or more instructions that cause the at least one processor to determine the authentication mode is one of the at least one second factor authentication mode cause the at least one processor to determine the authentication mode is the static PIN authentication mode based on the selection of the authentication mode of the plurality of authentication modes, wherein the enrolment request to authenticate the second payment transaction request using the one of the at least one second factor authentication mode comprises a first enrolment request to authenticate the second payment transaction request using the static PIN authentication mode, wherein, the one or more instructions that cause the at least one processor to communicate with the device to receive the second factor authentication data, cause the at least one processor to communicate with the device to receive a static PIN, and wherein, the one or more instructions that cause the at least one processor to enroll the device, cause the at least one processor to enroll the device based on the static PIN.

Clause 16: A computer-implemented method comprising: receiving, by at least one processor, a selection of an application of a first payment facilitator of a plurality of payment facilitators and a first account identifier of at least one account identifier associated with the payment facilitator from a device; based on the selection, receiving, by at least one processor, a device registration request and a device attestation response including a token from the application of the first payment facilitator of the plurality of payment facilitators, wherein the token is sent by a first server to a second server, and wherein, in response to receiving the token from the first server, the second server sends device information to the first server; in response to the device registration request, providing, by the at least one processor, a device registration response to the application of the first payment facilitator of the plurality of payment facilitators, wherein the device registration response is stored by the application of the first payment facilitator of the plurality of payment facilitators; receiving, by the at least one processor from the application of the first payment facilitator of the plurality of payment facilitators, a first payment transaction request and an enrolment request to authenticate a second payment transaction request using a first type of authentication mode; and enrolling, by the at least one processor, the application of the first payment facilitator of the plurality of payment facilitators to the first type of authentication mode and providing a cryptogram to the application of the first payment facilitator of the plurality of payment facilitators based on a result of the first payment transaction request, wherein the cryptogram is used for authenticating the second payment transaction request.

Clause 17: The computer-implemented method of clause 16, further comprising: generating, by the at least one processor, the token, wherein the token comprises a plurality of token features, and wherein the plurality of token features comprise at least a token owner identifier; and setting, by the at least one processor, the token owner identifier of the token to match an identifier associated with the first payment facilitator of the plurality of payment facilitators.

Clause 18: The computer-implemented method of clause 16 or 17, wherein after setting the token owner identifier to match the identifier associated with the first payment facilitator of the plurality of payment facilitators, the token can only be used by the application of the first payment facilitator of the plurality of payment facilitators.

Clause 19: The computer-implemented method of any one of clauses 16-18, further comprising: generating, by the at least one processor, a private key and a public key, wherein the private key is stored by the application of the first payment facilitator of the plurality of payment facilitators on the first server, and wherein the public key is stored by an issuer on an issuer server.

Clause 20: The computer-implemented method of any one of clauses 16-19, wherein providing the cryptogram comprises: generating, by the at least one processor, the cryptogram based on the private key, wherein the cryptogram is signed by the first payment facilitator of the plurality of payment facilitators.

Clause 21: The computer-implemented method of any one of clauses 16-20, wherein authenticating the second payment transaction request comprises: verifying, by the at least one processor, that the token owner identifier of the token matches an identifier associated with the first payment facilitator of the plurality of payment facilitators based on the cryptogram; and authenticating, by the at least one processor, the second payment transaction request based on the cryptogram.

Clause 22: A system comprising at least one processor, the at least one processor programmed or configured to: receive a selection of an application of a first payment facilitator of a plurality of payment facilitators and a first account identifier of at least one account identifier associated with the payment facilitator from a device; based on the selection, receive a device registration request and a device attestation response including a token from the application of the first payment facilitator of the plurality of payment facilitators, wherein the token is sent by a first server to a second server, and wherein, in response to receiving the token from the first server, the second server sends device information to the first server; in response to the device registration request, provide a device registration response to the application of the first payment facilitator of the plurality of payment facilitators, wherein the device registration response is stored by the application of the first payment facilitator of the plurality of payment facilitators; receive from the application of the first payment facilitator of the plurality of payment facilitators, a first payment transaction request and an enrolment request to authenticate a second payment transaction request using a first type of authentication mode; and enroll the application of the first payment facilitator of the plurality of payment facilitators to the first type of authentication mode and provide a cryptogram to the application of the first payment facilitator of the plurality of payment facilitators based on a result of the first payment transaction request, wherein the cryptogram is used for authenticating the second payment transaction request.

Clause 23: The system of clause 22, wherein the at least one processor is further programmed or configured to: generate the token, wherein the token comprises a plurality of token features, and wherein the plurality of token features comprise at least a token owner identifier; and set the token owner identifier of the token to match an identifier associated with the first payment facilitator of the plurality of payment facilitators.

Clause 24: The system of clause 22 or 23, wherein after setting the token owner identifier to match the identifier associated with the first payment facilitator of the plurality of payment facilitators, the token can only be used by the application of the first payment facilitator of the plurality of payment facilitators.

Clause 25: The system of any one of clauses 22-24, wherein the at least one processor is programmed or configured to: generate a private key and a public key, wherein the private key is stored by the application of the first payment facilitator of the plurality of payment facilitators on the first server, and wherein the public key is stored by an issuer on an issuer server.

Clause 26: The system of any one of clauses 22-25, wherein, when providing the cryptogram, the at least one processor is programmed or configured to: generate the cryptogram based on the private key, wherein the cryptogram is signed by the first payment facilitator of the plurality of payment facilitators.

Clause 27: The system of any one of clauses 22-26, wherein, when authenticating the second payment transaction request, the at least one processor is programmed or configured to: verify that the token owner identifier of the token matches an identifier associated with the first payment facilitator of the plurality of payment facilitators based on the cryptogram; and authenticate the second payment transaction request based on the cryptogram.

Clause 28: A computer program product comprising at least one non-transitory computer readable medium comprising one or more instructions that, when executed by at least one processor, cause the at least one processor to: receive a selection of an application of a first payment facilitator of a plurality of payment facilitators and a first account identifier of at least one account identifier associated with the payment facilitator from a device; based on the selection, receive a device registration request and a device attestation response including a token from the application of the first payment facilitator of the plurality of payment facilitators, wherein the token is sent by a first server to a second server, and wherein, in response to receiving the token from the first server, the second server sends device information to the first server; in response to the device registration request, provide a device registration response to the application of the first payment facilitator of the plurality of payment facilitators, wherein the device registration response is stored by the application of the first payment facilitator of the plurality of payment facilitators; receive from the application of the first payment facilitator of the plurality of payment facilitators, a first payment transaction request and an enrolment request to authenticate a second payment transaction request using a first type of authentication mode; and enroll the application of the first payment facilitator of the plurality of payment facilitators to the first type of authentication mode and provide a cryptogram to the application of the first payment facilitator of the plurality of payment facilitators based on a result of the first payment transaction request, wherein the cryptogram is used for authenticating the second payment transaction request.

Clause 29: The computer program product of clause 28, wherein the one or more instructions cause the at least one processor to: generate the token, wherein the token comprises a plurality of token features, and wherein the plurality of token features comprise at least a token owner identifier; and set the token owner identifier of the token to match an identifier associated with the first payment facilitator of the plurality of payment facilitators.

Clause 30: The computer program product of clause 28 or 29, wherein after setting the token owner identifier to match the identifier associated with the first payment facilitator of the plurality of payment facilitators, the token can only be used by the application of the first payment facilitator of the plurality of payment facilitators.

Clause 31: The computer program product of any one of clauses 28-30, wherein the one or more instructions cause the at least one processor to: generate a private key and a public key, wherein the private key is stored by the application of the first payment facilitator of the plurality of payment facilitators on the first server, and wherein the public key is stored by an issuer on an issuer server.

Clause 32: The computer program product of any one of clauses 28-31, wherein, the one or more instructions that cause the at least one processor to provide the cryptogram, cause the at least one processor to: generate the cryptogram based on the private key, wherein the cryptogram is signed by the first payment facilitator of the plurality of payment facilitators.

Clause 33: The computer program product of any one of clauses 28-32, wherein, the one or more instructions that cause the at least one processor to authenticate the second payment transaction request, cause the at least one processor to: verify that the token owner identifier of the token matches an identifier associated with the first payment facilitator of the plurality of payment facilitators based on the cryptogram; and authenticate the second payment transaction request based on the cryptogram.

Clause 34: A computer-implemented method comprising: receiving, by at least one processor, a device registration request and a device attestation response including a first token from a device, wherein the first token is sent by a first server to a second server, and wherein, in response to receiving the first token from the first server, the second server sends device information to the first server; in response to the device registration request, providing, by the at least one processor, a device registration response to the device, wherein the device registration response is stored on the device; in response to the device scanning a QR code by a QR code scanning application on the device, receiving, by the at least one processor from the device, a first payment transaction request based on the QR code and an enrolment request to authenticate a second payment transaction request using a first type of authentication mode; and enrolling, by the at least one processor, the device to the first type of authentication mode and providing a second token to the device based on a result of the first payment transaction request, wherein the second token is used for authenticating the second payment transaction request initiated in response to the device scanning a second QR code by the QR code scanning application.

Clause 35: The computer-implemented method of clause 34, wherein authenticating the second payment transaction request comprises: in response to the device scanning the second QR code by the QR code scanning application, receiving, by the at least one processor from the device, the second payment transaction request based on the second QR code; in response to receiving the second payment transaction request, communicating, by the at least one processor, with an authentication server based on the second token; receiving, by the at least one processor, an account identifier associated with the second token from the authentication sever; and processing, by the at least one processor, the second payment transaction request based on the account identifier.

Clause 36: The computer-implemented method of clause 34 or 35, wherein the authentication server communicates the account identifier without additional communications.

Clause 37: A system comprising at least one processor, the processor programmed or configured to: receive a device registration request and a device attestation response including a first token from a device, wherein the first token is sent by a first server to a second server, and wherein, in response to receiving the first token from the first server, the second server sends device information to the first server; in response to the device registration request, provide a device registration response to the device, wherein the device registration response is stored on the device; in response to the device scanning a QR code by a QR code scanning application on the device, receive a first payment transaction request based on the QR code and an enrolment request to authenticate a second payment transaction request using a first type of authentication mode; and enroll the device to the first type of authentication mode and providing a second token to the device based on a result of the first payment transaction request, wherein the second token is used for authenticating the second payment transaction request initiated in response to the device scanning a second QR code by the QR code scanning application.

Clause 38: The system of clause 37, wherein, when authenticating the second payment transaction request, the at least one processor is programmed or configured to: in response to the device scanning the second QR code by the QR code scanning application, receive, from the device, the second payment transaction request based on the second QR code; in response to receiving the second payment transaction request, communicate with an authentication server based on the second token; receive an account identifier associated with the second token from the authentication sever; and process the second payment transaction request based on the account identifier.

Clause 39: The system of clause 37 or 38, wherein the authentication server communicates the account identifier without additional communications.

Clause 40: A computer program product comprising at least one non-transitory computer readable medium comprising one or more instructions that, when executed by at least one processor, cause the at least one processor to: receive a device registration request and a device attestation response including a first token from a device, wherein the first token is sent by a first server to a second server, and wherein, in response to receiving the first token from the first server, the second server sends device information to the first server; in response to the device registration request, provide a device registration response to the device, wherein the device registration response is stored on the device; in response to the device scanning a QR code by a QR code scanning application on the device, receive a first payment transaction request based on the QR code and an enrolment request to authenticate a second payment transaction request using a first type of authentication mode; and enroll the device to the first type of authentication mode and providing a second token to the device based on a result of the first payment transaction request, wherein the second token is used for authenticating the second payment transaction request initiated in response to the device scanning a second QR code by the QR code scanning application.

Clause 41: The computer program product of clause 40, wherein, the one or more instructions that cause the at least one processor to authenticate the second payment transaction request, cause the at least one processor to: in response to the device scanning the second QR code by the QR code scanning application, receive, from the device, the second payment transaction request based on the second QR code; in response to receiving the second payment transaction request, communicate with an authentication server based on the second token; receive an account identifier associated with the second token from the authentication sever; and process the second payment transaction request based on the account identifier.

Clause 42: The computer program product of clause 40 or 41, wherein the authentication server communicates the account identifier without additional communications.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of illustrative embodiments or aspects when read in conjunction with the accompanying drawings. The accompanying drawings, which are incorporated in and constitute a part of this disclosure, illustrate exemplary embodiments or aspects and, together with the description, serve to explain the disclosed principles. In the figures, the left-most digit(s) of a reference number identifies the figure in which the reference number first appears. One or more embodiments or aspects are now described, by way of example only, with reference to the accompanying figures, wherein like reference numerals represent like elements and in which:

FIG. 4A is a device attestation response received from a second server, in accordance with some non-limiting embodiments or aspects of the present disclosure;

FIG. 4B is a device integrity status determined using the device attestation response, in accordance with some non-limiting embodiments or aspects of the present disclosure;

FIG. 6A is a table of a consent or a dissent received from at least one issuer, in accordance with some non-limiting embodiments or aspects of the present disclosure;

FIG. 6B is a table of a priority associated with the one or more authentication modes received from the at least one issuer, in accordance with some non-limiting embodiments or aspects of the present disclosure;

FIG. 6C is an association map between the one or more authentication modes and at least one issuer, in accordance with some non-limiting embodiments or aspects of the present disclosure;

Figure 1:
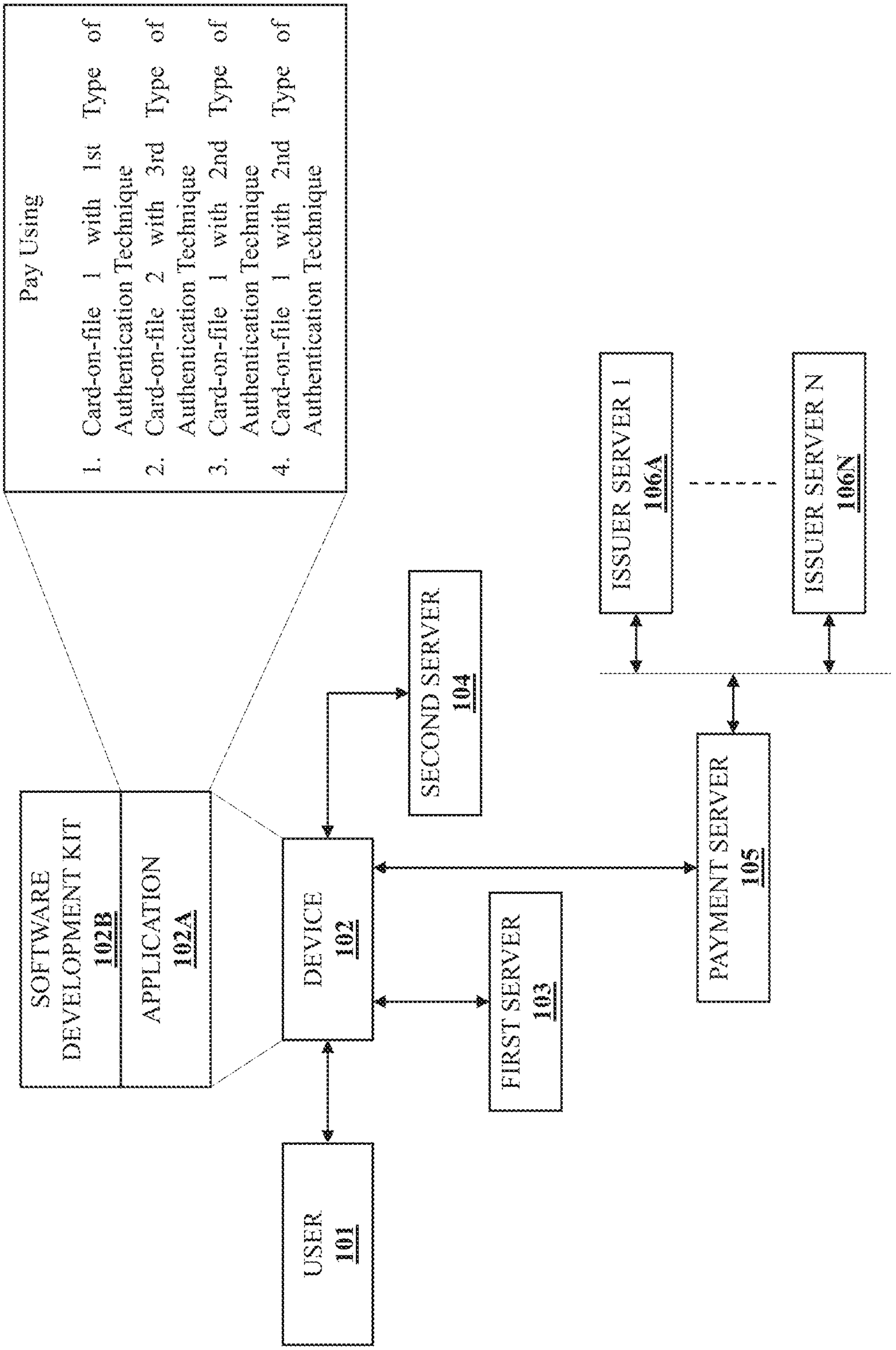
FIG. 1 is an environment for authenticating digital transactions according to some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like). The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" or "computing unit" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

The present disclosure relates to a system and computer-implemented method for authenticating digital transactions. In some non-limiting embodiments or aspects, the method includes receiving a device registration request and a device attestation response including at least a device integrity status from a device. In response to the device registration request, the method includes providing a device registration response to the device, based on validation of the device integrity status. Further, the method includes receiving a first payment transaction request and an enrolment request from the device via an application to authenticate a second payment transaction request using a first type of authentication mode. Finally, the method includes enrolling the device to the first type of authentication mode and providing a second token to the device based on a result of the first payment transaction request, wherein the second token is used for authenticating the second payment transaction request.

The present disclosure also provides for enhanced security using selectable second factor authentication (e.g., a static PIN, biometric authentication, and/or the like) set by the user. In some non-limiting embodiments or aspects, the method includes receiving a device registration request, a device attestation response comprising a first token, and a selection of an authentication mode of a plurality of authentication modes from a device. The method includes determining the authentication mode is a second factor (e.g., static PIN, etc.) authentication mode. In response to the device registration request and determining that the authentication mode is the second factor authentication mode, the method includes providing a device registration response to the device. Further, the method includes receiving a first payment transaction request and an enrolment request to authenticate a second payment transaction request using the second factor (e.g., static PIN, etc.) authentication mode; communicating with the device to receive second factor authentication data (e.g., a static PIN, etc.) from the device and, finally, enrolling the device based on the second factor authentication data (e.g., the static PIN, etc.). In this way, the present disclosure provides users the ability to select a second factor (e.g., static PIN, etc.) authentication mode, which provides enhanced security seamlessly integrated into the flow for network-based authentication of online payments. Also, the present disclosure enables different types of tokens with different states, which can be used to facilitate the second factor (e.g., static PIN) authentication mode.

Additionally, the present disclosure provides enhanced scalability and flexibility for network-based authentication of online payments. For example, in some non-limiting embodiments or aspects, the method includes receiving a selection of an application of a first payment facilitator of a plurality of payment facilitators and a first account identifier of at least one account identifier associated with the payment facilitator from a device. Based on the selection, receiving a device registration request and a device attestation response including a token from the application of the first payment facilitator of the plurality of payment facilitators. In response to the device registration request, providing a device registration response to the application of the first payment facilitator of the plurality of payment facilitators. Further, the method includes, receiving a first payment transaction request and an enrolment request to authenticate a second payment transaction request using a first type of authentication mode. Finally, the method includes enrolling the application of the first payment facilitator of the plurality of payment facilitators to the first type of authentication mode and providing a cryptogram to the application of the first payment facilitator of the plurality of payment facilitators based on a result of the first payment transaction request. In this way, the present application provides scalability by allowing merchants to work with multiple application and/or SDK providers. For example, a user can choose between multiple application and/or SDK providers.

Further, the present application provides flexibility to extend the framework to different methods of payment. For example, in some non-limiting embodiments or aspects, the method includes receiving a device registration request and a device attestation response including a first token from a device. In response to the device registration request, the method includes providing a device registration response to the device. In response to the device scanning a QR code by a QR code scanning application on the device, the method includes receiving a first payment transaction request based on the QR code and an enrolment request to authenticate a second payment transaction request using a first type of authentication mode. Additionally, the method includes enrolling the device to the first type of authentication mode and providing a second token to the device based on a result of the first payment transaction request, wherein the second token is used for authenticating the second payment transaction request initiated in response to the device scanning a second QR code by the QR code scanning application. In this way, the present disclosure provides the flexibility to extend the framework to different methods of payments, for example, payment via a QR code scanning application.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 is an environment 100 for authenticating digital transactions according to some non-limiting embodiments or aspects of the present disclosure. In some non-limiting embodiments or aspects, user 101 may enroll device 102 with payment server 105 to a first type of authentication mode while performing an online payment including a first payment transaction. For example, device 102 may be a smartphone, a tablet computer, a laptop, and the like. User 101 may perform the online payment using an application 102A in device 102. For example, application 102A may be an e-commerce application, a QR code scanning application, a payment application, and the like.

In some non-limiting embodiments or aspects, application 102A may be associated with a merchant. The first payment transaction may be based on a card-on-file transaction (or a payment token transaction and/or the like), where the card-on-file (or the payment token) indicates payment card details (or a payment token) stored in application 102A or in first server 103 associated with application 102A. In some non-limiting embodiments or aspects, application 102A may prompt user 101 for enrolling device 102 to the first type of authentication mode. In some non-limiting embodiments or aspects, user 101 may select the card-on-file (or the payment token) associated with a payment card among a plurality of payment cards (or payment tokens) stored in application 102A for enrolling device 102 and the selected payment card (or payment token) for the first type of authentication mode. Application 102A may provide a device registration request including merchant information and the payment card details (or payment token details) to an SDK 102B in device 102. For example, SDK 102B may be one of Java® Development kit, .NET® framework SDK, iOS® SDK, and the like. In some non-limiting embodiments or aspects, an SDK may refer to a collection of software development tools in an installable package. The SDK may facilitate creation of an application based on the use of a compiler, debugger, and/or a software framework. In some non-limiting embodiments or aspects, an SDK may include or take the form of an application programming interface (API). SDK 102B in device 102 may generate a device attestation request including at least a first token or a nonce and provide the device attestation request to second server 104. The first token may be a pseudo random number generated using one or more cryptographic techniques, for example "A286G91SU". Second server 104 may provide a device attestation response including at least a device integrity status based on the first token to SDK 102B in device 102. For example, the device integrity status may be indicative of any tampering in the operating system of device 102 and application 102A.

In some non-limiting embodiments or aspects, payment server 105 may receive the device registration request and the device attestation response including at least the device integrity status from device 102 via application 102A and SDK 102B. Payment server 105 may validate the device attestation response by verifying an origin of the device attestation response using one or more cryptographic techniques (e.g., a digital signature technique) based on a first token. In response to the device registration request, payment server 105, in response to successful validation of the device attestation response, may provide a device registration response including at least a device identification value to device 102. Device 102 may provide the device registration response to application 102A via SDK 102B.

In some non-limiting embodiments or aspects, payment server 105 may receive the first payment transaction request and an enrolment request from device 102 via an application 102A and first server 103. The enrolment request may include at least one of a consent for registering application 102A to the first type of authentication mode, merchant information, a payment amount, and payment card (or payment token) information. The enrolment request, including the consent, may enable payment server 105 to authenticate a second payment transaction request using the first type of authentication mode. Payment server 105, upon validation of the payment card (or payment token) information, may provide, to application 102A via first server 103, at least one of a payment authentication request and an account identification value. Application 102A, via first server 103, may initiate the first payment transaction request including at least one of the payment authentication request and a payment authorization request for completing a transaction associated between user 101 and a merchant using at least the payment card (or payment token).

In some non-limiting embodiments or aspects, payment server 105 may facilitate processing of at least one of the payment authentication request and the payment authorization request based on one or more issuer authentication modes. For example, the one or more issuer authentication modes may be a 3-D Secure (3DS) technique. The person skilled in the art may appreciate the use of a static password, an OTP, and/or a PIN to process the payment authentication request and generation of a second payment authentication response. Payment server 105 may receive a first payment authentication response from device 102 and the second payment authentication response may be obtained while facilitating a payment authentication request based on one or more issuer authentication modes. In some non-limiting embodiments or aspects, payment server 105 may facilitate the payment authentication request using a third server (not shown in the figure). For example, the third server may be a Merchant Plug-In (MPI). The third server may interact with the merchant and facilitate processing of the payment authentication request. Further, payment server 105 may compare the first payment authentication response with the second payment authentication response to verify device 102. Based on a result of the first payment transaction request (e.g., the payment authentication request and the payment authorization request), payment server 105 may enroll device 102 and application 102A to the first type of authentication mode. Payment server 105 may generate a second token for authenticating the second payment transaction request using the first type of authentication mode, where the generated second token is provided to device 102 via first server 103, application 102A, and SDK 102B.

In some non-limiting embodiments or aspects, the first type of authentication mode may be a network-based authentication mode, where payment server 105 authenticates the second payment transaction request using the second token. Payment server 105 may generate a new token after successful completion of a payment transaction request, where the new token is used for authenticating the subsequent payment transaction request.

In some non-limiting embodiments or aspects, for user 101 to initiate the second payment transaction using the first type of authentication mode, issuer server (106A . . . 106N) associated with the payment card (or payment token) may provide the consent to authenticate the second payment transaction using the first type of authentication mode to payment server 105. In some non-limiting embodiments or aspects, payment server 105 may determine one or more authentication modes associated with at least one issuer by receiving from the at least one issuer via issuer server (106A . . . 106N) a consent or a dissent for authenticating a second payment transaction using the one or more authentication modes. Further, payment server 105 may identify the one or more authentication modes having the consent of the at least one issuer. The one or more authentication modes may include at least one of a first type of authentication mode, and one or more issuer authentication modes (e.g., a second type of authentication mode, a third type of authentication mode, and the like). For example, a first issuer may provide a consent to first type and third type of authentication modes and a dissent to a second type of authentication mode.

In some non-limiting embodiments or aspects, payment server 105 may provide the determined authentication modes to application 102A in device 102 registered with payment server 105 via first server 103. Application 102A may display the one or more authentication modes for user selection to initiate the second payment transaction. Upon user 101 selecting one of the one or more authentication modes for the second payment transaction, payment server 105 may receive, from application 102A via first server 103, the second payment transaction request with one of the one or more authentication modes selected by user 101.

In some non-limiting embodiments or aspects, payment server 105 may facilitate the processing of the second payment transaction request based on the selected one of the one or more authentication modes. For example, if the selected one of the one or more authentication modes is a first type of authentication mode, payment server 105 may generate the payment authentication response on behalf of issuer server (106A . . . 106N) associated with the payment card (or payment token). Further, payment server 105 may provide a result of processing the second payment transaction request to application 102A in device 102 via first server 103.

In some non-limiting embodiments or aspects, first server 103, second server 104, and payment server 105 may be communicatively connected to device 102 via a communication network (not shown in the figure). Further, first server 103, and issuer server (106A . . . 106N) may be communicatively coupled to payment server 105 via the communication network (not shown in the figure). Further, the communication network may include, for example, a direct interconnection, an e-commerce network, a peer to peer (P2P) network, a local area network (LAN), a wide area network (WAN), a wireless network (e.g., using Wireless Application Protocol), the Internet, Wi-Fi®, a cellular network, and the like.

Figure 2:
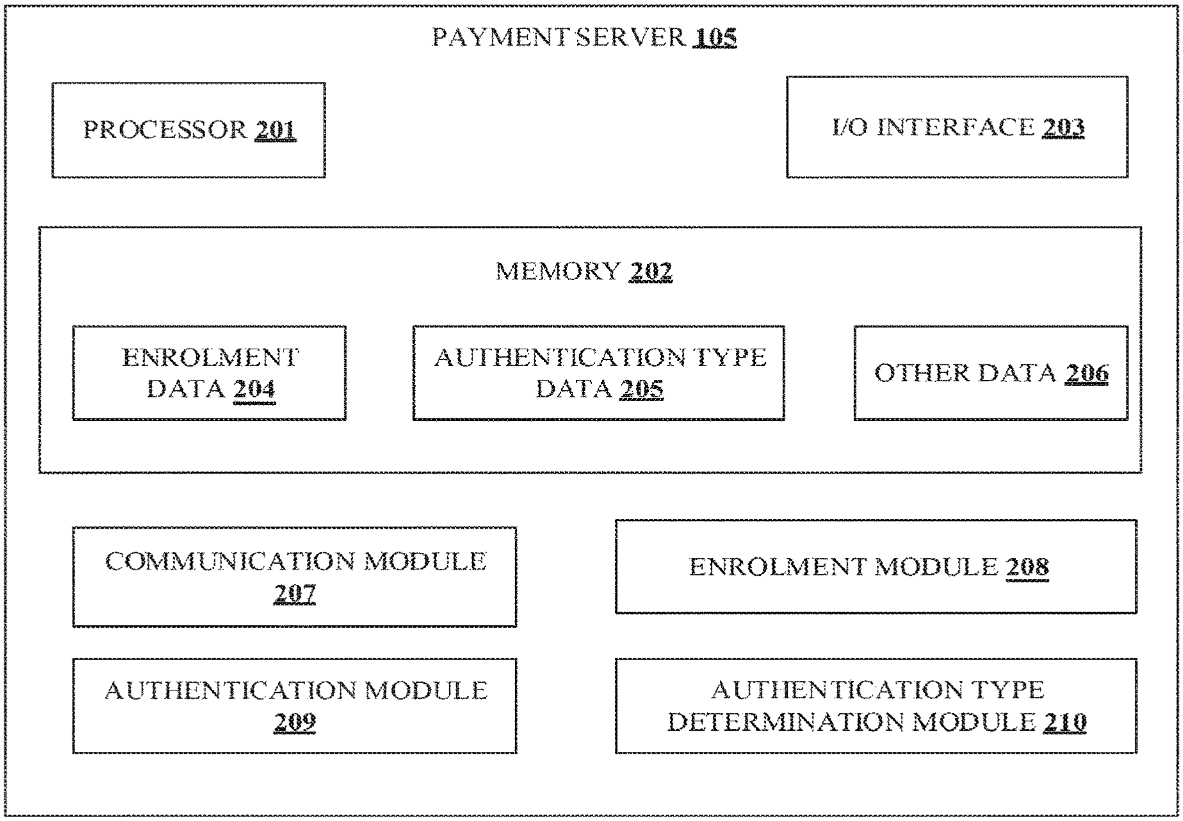
FIG. 2 is a simplified block diagram of a payment server for authenticating digital transactions, according to some non-limiting embodiments or aspects of the present disclosure.

Referring now to FIG. 2, shown is a simplified block diagram of a payment server for authenticating digital transactions, according to some non-limiting embodiments or aspects of the present disclosure. In some non-limiting embodiments or aspects, payment server 105 may include at least one Central Processing Unit ("CPU" or "processor") 201 and memory 202 storing instructions executable by at least one processor 201. Processor 201 may comprise at least one data processor for executing program components for executing user- or system-generated requests. Memory 202 is communicatively coupled to processor 201. Computing unit 200 may comprise Input/Output (I/O) interface 203. In some non-limiting embodiments or aspects, I/O interface 203 may be coupled with processor 201 through which an input signal and/or an output signal may be communicated. In some non-limiting embodiments or aspects, the data stored in memory 202 may include enrolment data 204, authentication type data 205, and/or other data 206. In some non-limiting embodiments or aspects, enrolment data 204 may include at least one of merchant information, a device identification value, a mobile number associated with device 102, an authorization code, and the account identification value. The merchant information may include at least one of a merchant card alias, a merchant application identification value, and/or a merchant customer identification value.

In some non-limiting embodiments or aspects, authentication type data 205 may include a consent or a dissent associated with the one or more authentication modes. The consent for the one or more authentication modes may indicate that the second payment transaction may be processed using one or more authentication modes. The dissent for the one or more authentication modes may indicate the second payment transaction may not be processed using one or more authentication modes. The consent or the dissent for the one or more authentication modes may be received from issuer server (106A . . . 106N). Authentication type data 205 associated with issuer server (106A . . . 106N) may be shown in FIG. 6A. In some non-limiting embodiments or aspects, other data 206 may include at least one of the first payment transaction request, the second payment transaction request, one or more cryptographic keys, and/or the like.

In some non-limiting embodiments or aspects, communication module 207 may be configured to receive the device registration request, the device attestation response, the first payment transaction request, the second payment transaction request, and/or the enrolment request from one of device 102 or first server 103. Communication module 207 may be configured to receive, from the at least one issuer via issuer server (106A . . . 106N), a consent or a dissent for authenticating the second payment transaction using the one or more authentication modes. Further, communication module 207 may be configured to send the device registration response, the second token, the determined authentication modes, and the result of the second payment transaction to device 102 via first server 103.

In some non-limiting embodiments or aspects, enrolment module 208 may be configured to verify the first payment authentication response received from device 102 with the second payment authentication response obtained while facilitating the payment authentication request based on the one or more issuer authentication modes. In response to successful verification, enrolment module 208 may be configured to enroll device 102 and application 102A to the first type of authentication mode by storing the merchant information, device identification value, and the account identification value in enrolment data 204. Further, enrolment module 208 may be configured to generate the second token for authenticating the second payment transaction request using the first type of authentication mode and provide the generated second token to device 102. In some non-limiting embodiments or aspects, authentication module 209 may be configured to authenticate the first payment transaction, the second payment transaction, and a third payment transaction using the one or more authentication modes including the first type of authentication mode or one or more issuer authentication modes.

In some non-limiting embodiments or aspects, an authentication type determination module 210 may be configured to receive, from the at least one issuer, a consent or a dissent for authenticating the second payment transaction using the one or more authentication modes and identifying the one or more authentication modes having the consent of the at least one issuer to determine the one or more authentication modes. Authentication type determination module 210 may be configured to compute a risk value for each of the determined authentication modes based on at least one of the merchant information, issuer information, user information, and/or device information. Based on the computed risk value, the consent of the determined authentication modes may be modified. Further, authentication type determination module 210 may be configured to provide the determined authentication modes to application 102A for user selection.

Figure 3:
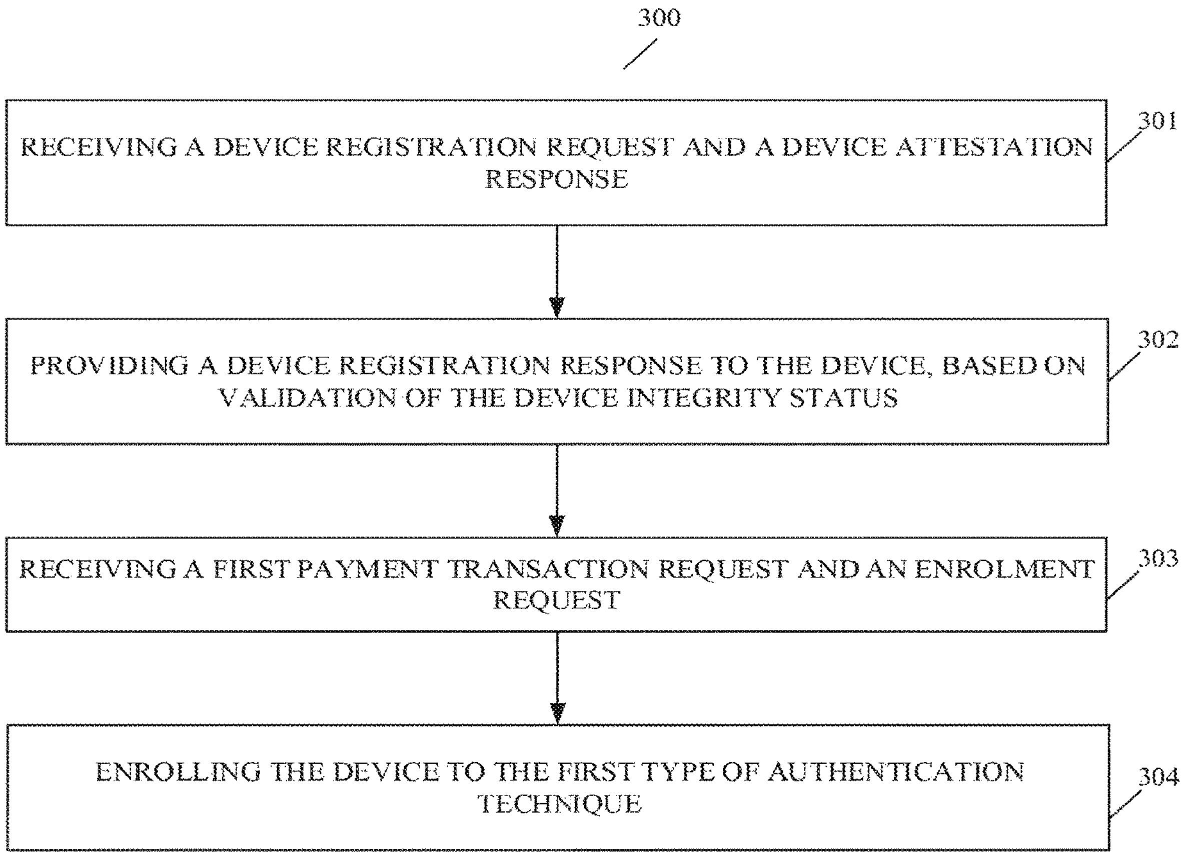
FIG. 3 is a flowchart of a non-limiting embodiment or aspect for enrolling a device to a first type of authentication mode.

Referring now to FIG. 3, shown is a flowchart 300 of a non-limiting embodiment or aspect for enrolling a device to a first type of authentication mode. The order in which the method is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, firmware, or a combination of hardware and software.

In some non-limiting embodiments or aspects, at step 301, payment server 105 may receive the device registration request and the device attestation response including at least the device integrity status from device 102. In some non-limiting embodiments or aspects, SDK 102B in device 102 may provide to second server 104 the device attestation request including at least the first token, upon receiving the device registration request including at least the merchant information from application 102A. The first token or nonce may be generated in device 102 by SDK 102B using one or more cryptographic techniques. In some non-limiting embodiments or aspects, the first token or nonce may be generated by payment server 105 and provided to SDK 102B in device 102. A person skilled in the art may appreciate the use of one or more pseudo random number generation techniques for generating the first token. For example, the first token may be "R2Rra24fVm5xa2Mg".

Referring now to FIG. 4A, shown is a device attestation response received from a second server, in accordance with some non-limiting embodiments or aspects of the present disclosure.

Referring now to FIG. 4B, shown is a device integrity status determined using the device attestation response, in accordance with some non-limiting embodiments or aspects of the present disclosure.

In some non-limiting embodiments or aspects, SDK 102B in device 102 may receive, from second server 104, the device attestation response including at least the device integrity status based on the first token. For example, device attestation response 401 shown in FIG. 4A, may include a timestamp of the response generated by second server 104 (e.g., timestamp), the first token or nonce, a name of application 102A (e.g., PackageName), a cryptographic hash or digital certificate associated with application 102A and/or with device 102 indicative of the integrity of application 102A (e.g., CertificateDigestSha256), and the device integrity status (e.g., ProfileMatch and Integrity).

In some non-limiting embodiments or aspects, device 102 may, upon receiving device attestation response 401 from second server 104, provide the device registration request and device attestation response 401 via SDK 102B. For example, the device registration request may include at least one of a merchant card alias, the application identification value, a merchant customer identification value, the mobile number associated with device 102, $\text{encrypted}_{v\_static\_public\_key}$ ($\text{signed}_{device\_private\_key}$ (first token, device_public_key, device key type, device key size, device attestation response 401)), and a v_static_public_key reference identification value, where $\text{encrypted}_{v\_static\_public\_key}$ indicates an encryption using one or more cryptographic techniques (e.g., public key encryption) using "v_static_public_key" as a public key associated with payment server 105 and $\text{signed}_{device\_private\_key}$ indicates signing using one or more cryptographic techniques (e.g., public key encryption or digital signature techniques) using "device_private_key" as a private key associated with device 102.

In some non-limiting embodiments or aspects, at step 302, process 300 includes, in response to receiving the device registration request, providing, by payment server 105, the device registration response to device 102, based on validation of the device integrity status. In some non-limiting embodiments or aspects, providing the device registration response may include validating device attestation response 401 by verifying the origin of device attestation response 401 using the one or more cryptographic techniques (for example, validating the Secure Sockets Layer (SSL) certificate, a digital signature associated with device attestation response 401, and the timestamp in device attestation response 401) based on the first token. In some non-limiting embodiments or aspects, the device integrity status may be verified based on the values of "ProfileMatch" and "Integrity" in device attestation response 401 for device 102 with an Android® operating system using table 402 as shown in FIG. 4B. For example, a true value associated with "ProfileMatch" and "Integrity" is indicative of successful validation of device 102 and a false value associated with at least one of "ProfileMatch" and/or "Integrity" is indicative of unsuccessful validation of device 102. Additionally, or alternatively, the device integrity status may be verified based on behavioral analytics (e.g., Visa Behavioral Analytics (VBA) and/or the like).

In some non-limiting embodiments or aspects, in response to successful validation, payment server 105 may send the device registration response including at least a device identification value to SDK 102B in device 102. For example, the device registration response may include $\text{encrypted}_{device\_public\_key}$ ($\text{signed}_{v\_static\_private\_key}$ (device identification value, authorization code, v_public_key, v_key type, v_key size)), where $\text{encrypted}_{device\_public\_key}$ indicates encryption using one or more cryptographic techniques (e.g., public key encryption) using "device_public_key" as a public key associated with device 102 and $\text{signed}_{v\_static\_private\_key}$ indicates signing using one or more cryptographic techniques (e.g., public key encryption or digital signature techniques) using "v_static_private_key"

as a private key associated with payment server 105. In response to an unsuccessful validation, payment server 105 may send the device registration response including at least an error message to SDK 102B in device 102. For example, the error message may be indicative of a failure of the device integrity check. In some non-limiting embodiments or aspects, SDK 102B in device 102 provides the $\text{encrypted}_{v\_public\_key}$ (authorization code) and $\text{signed}_{device\_private\_key}$ (device identification value) to application 102A for enrolling to the first type of authentication mode.

In some non-limiting embodiments or aspects, at step 303, process 300 may include receiving, by payment server 105, the first payment transaction request and the enrolment request from device 102 via application 102A to authenticate the second payment transaction request using the first type of authentication mode. In some non-limiting embodiments or aspects, the enrolment request may be received after first server 103 receives, via application 102A from device 102, the enrolment request including at least one of the consent for registering application 102A to the first type of authentication mode, the merchant information, the payment amount, and/or the payment card (or payment token) information. For example, the enrolment request may include Primary Account Number (PAN) (or payment token based thereon), expiry date associated with the payment card (or payment token), Card Verification Value (CVV2), the payment amount, a type of currency associated with the payment amount, the consent for registering to the first type of authentication mode, the merchant customer identification value, the merchant application identification value, the mobile number associated with device 102, $\text{signed}_{device\_private\_key}$ (device identification value), $\text{encrypted}_{v\_public\_key}$ (authorization code), and merchant card alias.

In some non-limiting embodiments or aspects, upon validation of the payment card (or payment token) information, payment server 105 may provide to application 102A in device 102 via first server 103 at least one of the payment authentication request and the account identification value. For example, payment server 105 may provide an Access Control Server (ACS) URL, the payment authentication request, and the account identification value to application 102A. Payment server 105 may obtain the ACS URL, the payment authentication request, and the account identification value from the third server (for example, the MPI). Application 102A in device 102 may initiate the first payment transaction request including the payment authentication request. In some non-limiting embodiments or aspects, payment server 105 may receive the first payment transaction request including at least one of a payment authentication request and a payment authorization request from first server 103 for completing a transaction associated between user 101 and a merchant using at least a payment card (or payment token).

In some non-limiting embodiments or aspects, at step 304, payment server 105 may enroll device 102 to the first type of authentication mode and provides the second token to device 102 based on the result of the first payment transaction request, where the second token is used for authenticating the second payment transaction request. In some non-limiting embodiments or aspects, payment server 105 may receive the result of the first payment transaction request after facilitating the processing of at least one of a payment authentication request and a payment authorization request based on one or more issuer authentication modes. For example, the one or more issuer authentication modes may be a 3DS technique. The person skilled in the art may appreciate the use of a static password, an OTP, and/or a PIN to process the payment authentication request and generate a second payment authentication response. For example, the second payment authentication response may include the account identification value and the device identification value.

In some non-limiting embodiments or aspects, the enrolment of device 102 may include verifying, by payment server 105, the first payment authentication response received from device 102 with the second payment authentication response obtained while facilitating a payment authentication request based on one or more issuer authentication modes. For example, the first payment authentication response may include $\text{signed}_{device\_private\_key}$ (device identification value), merchant card alias, merchant app ID, merchant customer ID, $\text{encrypted}_{v\_public\_key}$ ($\text{signed}_{device\_private\_key}$ (first payment authentication response)), and $\text{encrypted}_{v\_public\_key}$ (authorization code). Payment server 105 may verify the first payment authentication response and second authentication response by performing a byte-by-byte check and validating the digital signature associated with the first and second payment authentication responses. Payment server 105, in response to the second payment authentication response, may provide Cardholder Authentication Verification Value (CAVV) and Electronic Commerce Indicator (ECI) to first server 103 indicating a successful authentication of the payment card (or payment token). First server 103 may initiate the payment authorization request including at least one of the account identification value and VCIND (indicating the first type of authentication mode is used for authenticating the second payment transaction during processing of the payment authorization request). Payment server 105 may facilitate the payment authorization request.

In some non-limiting embodiments or aspects, payment server 105, in response to successful verification, may enroll device 102 and application 102A to the first type of authentication mode. In some non-limiting embodiments or aspects, payment server 105 may generate the second token for authenticating the second payment transaction request using the first type of authentication mode, wherein the generated second token may be provided to SDK 102B in device 102 via first server 103. For example, the generated second token provided to device 102 is of the form $\text{signed}_{v\_private\_key}$ ($\text{encrypted}_{device\_public\_key}$ (second token)).

Figure 5:
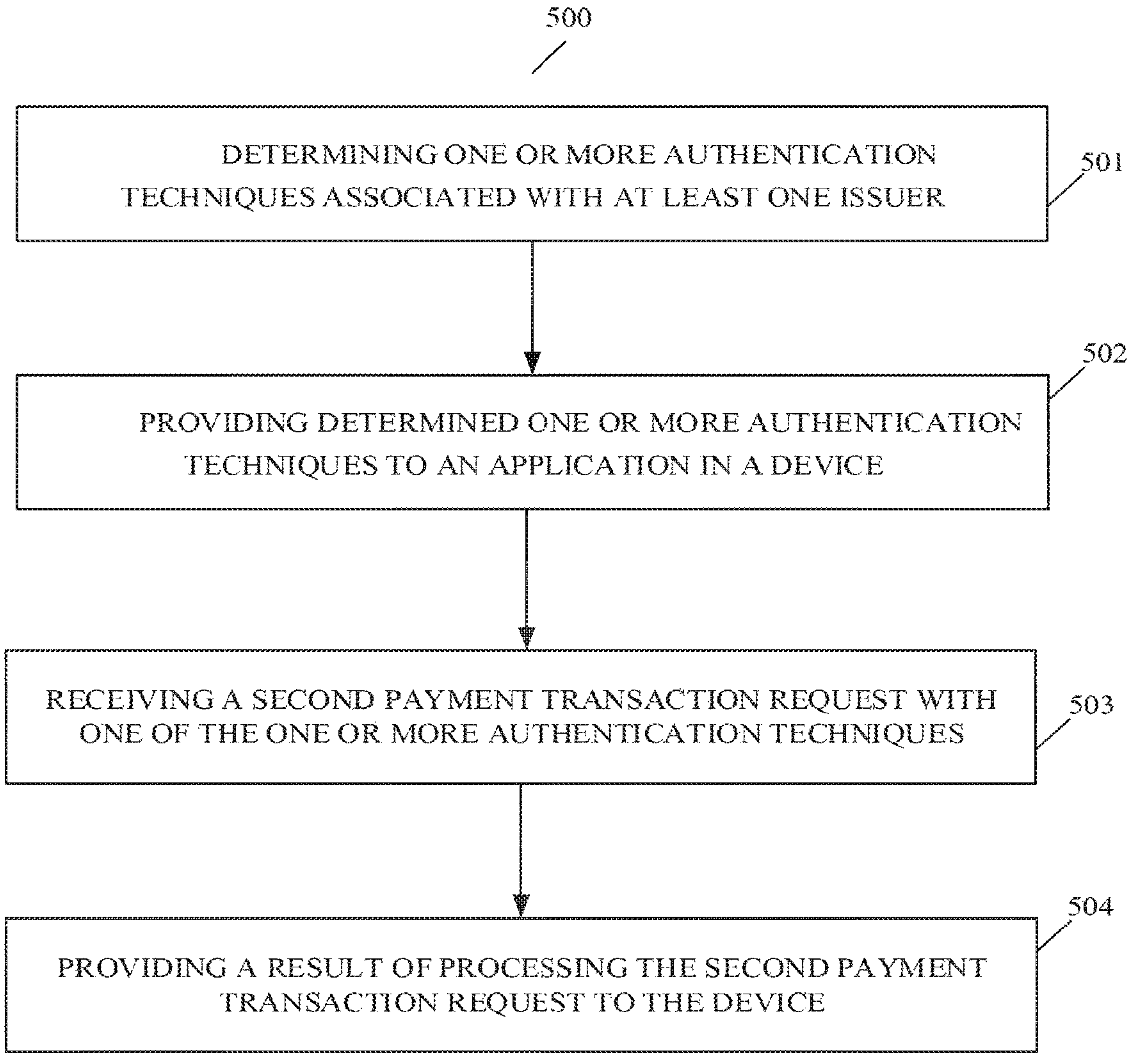
FIG. 5 is a flowchart of a non-limiting embodiment or aspect for authenticating a digital transaction using one or more authentication modes.

Referring now to FIG. 5, shown is a flowchart 500 of a non-limiting embodiment or aspect for authenticating a digital transaction using one or more authentication modes.

The order in which the method is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, firmware, or a combination of hardware and software.

Referring now to FIG. 6A, shown is a table 601 of a consent or a dissent received from at least one issuer, in accordance with some non-limiting embodiments or aspects of the present disclosure.

Referring now to FIG. 6B, shown is a table 602 of a priority associated with the one or more authentication modes received from the at least one issuer, in accordance with some non-limiting embodiments or aspects of the present disclosure.

Referring now to FIG. 6C, shown is an association map 603 between the one or more authentication modes and at least one issuer, in accordance with some non-limiting embodiments or aspects of the present disclosure.

Referring back to FIG. 5, at step 501, payment server 105 may determine the one or more authentication modes associated with the at least one issuer. The one or more authentication modes may include at least one of the first type of authentication mode and the one or more issuer authentication modes. For example, the first type of authentication mode may be a network authentication mode and the one or more issuer authentication modes may be the 3DS based authentication mode. In some non-limiting embodiments or aspects, payment server 105 may receive, from the at least one issuer via issuer server (106A . . . 106N), the consent or the dissent for authenticating the second payment transaction using the one or more authentication modes. For example, the consent or dissent 601 received, from at least one issuer via issuer server (106A . . . 106N), is shown in a table of FIG. 6A. The consent is denoted by "V" and the dissent is denoted by "x" in FIG. 6A. Payment server 105 may identify the one or more authentication modes having the consent of the at least one issuer. In some non-limiting embodiments or aspects, payment server 105 may receive, from the at least one issuer via issuer server (106A . . . 106N), a priority 602 associated with the one or more authentication modes having the consent of the at least one issuer as shown in FIG. 6B. The priority 602 associated with the one or more authentication modes may be indicative of the preferred authentication mode for the second payment transaction based on a success rate associated with one or more previous payment transactions processed by the at least one issuer. For example, "1" may indicate highest priority or the first preferred authentication mode. The priority 602 associated with the one or more authentication modes may be modified by the at least one issuer after a predefined time interval, for example, 30 minutes.

Referring back to FIG. 5, at step 502, payment server 105 may provide the determined authentication modes to application 102A in device 102 registered with payment server 105, where the one or more authentication modes are displayed in application 102A for user selection. In some non-limiting embodiments or aspects, payment server 105 may compute a risk value for each of the determined authentication modes based on at least one of merchant information, issuer information, and user information. For example, the merchant information may include at least one of merchant card alias, merchant application identification value (e.g., application identification value of a user facing application), merchant customer identification value (e.g., a payment facilitator's customer identification value), acquirer bank details, and the like, the issuer information may include at least one of issuer bank details associated with the payment card (or payment token) and the like, and the user information may include at least one of the PAN, the expiry date associated with the payment card (or payment token), the CVV2, the mobile number, and the like. In some non-limiting embodiments or aspects, payment server 105 may modify the consent of the determined one or more authentication modes based on the computed risk value. For example, payment server 105 may modify the consent associated with the "3$^{rd}$ Authentication mode" of an "Issuer A" into a dissent based on the computed risk value, as shown in FIG. 6C. Payment server 105 may provide determined authentication modes 603 to application 102A in device 102 for user selection.

Referring back to FIG. 5, at step 503, payment server 105 may receive the second payment transaction request with one of the one or more authentication modes selected by user 101. In some non-limiting embodiments or aspects, the second payment transaction request may include at least one of the payment authentication request and the payment authorization request. In some non-limiting embodiments or aspects, if one of the one or more authentication modes selected by user 101 are the first type of authentication mode, then payment server 105 may perform the payment authentication request associated with the second payment transaction. If one of the one or more authentication modes selected by user 101 are not the first type of authentication mode, then payment server 105 may facilitate processing of the payment authentication request associated with the second payment transaction via the at least one issuer associated with the payment card (or payment token) details in the second payment transaction.

At step 504, payment server 105 may provide a result of processing the second payment transaction request to device 102, where payment server 105 facilitates the processing of the second payment transaction request. In some non-limiting embodiments or aspects, payment server 105 may facilitate the processing of the second payment transaction request via the at least one issuer associated with the payment card (or payment token) in the second payment transaction request when the one of the one or more authentication modes selected by user 101 is not the first type of authentication mode. In this case, the payment authentication request for the second payment transaction request may be processed using the one or more issuer authentication modes. When the one of the one or more authentication modes selected by user 101 are the first type of authentication mode, payment server 105 may receive the second payment transaction request including at least device attestation response 401, the payment amount, the second token, the merchant information, the payment card (or payment token) information, the payment authentication request, and the payment authorization request. For example, payment server 105 may receive at least one of the PAN, the expiry date associated with the payment card (or payment token), the payment amount, the type of currency associated with the payment amount, signed$_{device_private_key}$ (device identification value), merchant customer identification value, merchant application identification value, encrypted$_{v_public_key}$ (signed$_{device_private_key}$ (second token, timestamp, device attestation response 401)), and the first type of authentication mode.

In some non-limiting embodiments or aspects, payment server 105 may generate a third token upon processing the payment authentication request and the payment authorization request associated with the second payment transaction, where the generated third token is provided to device 102 for authenticating a third payment transaction. In some non-limiting embodiments or aspects, payment server 105 may verify whether the payment amount is less than a predefined amount, for example, 2000INR (USD 28). If the payment amount is less than the predefined amount, payment server 105 may provide CAVV, ECI, signed$_{v_private_key}$ (encrypted$_{device_public_key}$ (third token)) to first server 103. First server 103 may initiate the payment authorization request upon receiving the CAVV and the ECI. In some non-limiting embodiments or aspects, the encrypted$_{device_public_key}$ (third token) may be provided to SDK 102B in device 102 for authenticating the third payment transaction.

In some non-limiting embodiments or aspects, the first payment transaction request, the second payment transaction request, and the third payment transaction request initiated by application 102A in device 102 may be indicative of the digital transactions. In some non-limiting embodiments or aspects, if the payment amount is greater than the predefined amount, payment server 105 may provide the ACS URL and the payment authentication request to first server 103 for completing the second payment transaction using the one or more issuer authentication modes.

The method of authenticating the digital transaction may include enrolling device 102 and application 102A for the first type of authentication mode and authenticating the second payment transaction request using the one of the one or more authentication modes selected by user 101. Payment server 105 may authenticate the second payment transaction on behalf of the at least one issuer for the first type of authentication mode. The authentication using the first type of authentication mode may enable payment server 105 to perform additional fraud and/or risk checks for the second payment transaction. Further, the first type of authentication mode may eliminate the need for a short-message-service based OTP authentication model. The first type of authentication mode may provide an increased payment success rate to user 101. The first type of authentication mode may provide security to the digital transactions because of device registration and token-based authentication for every payment transaction. Furthermore, the first type of authentication mode may verify device integrity for every transaction.

Figure 7:
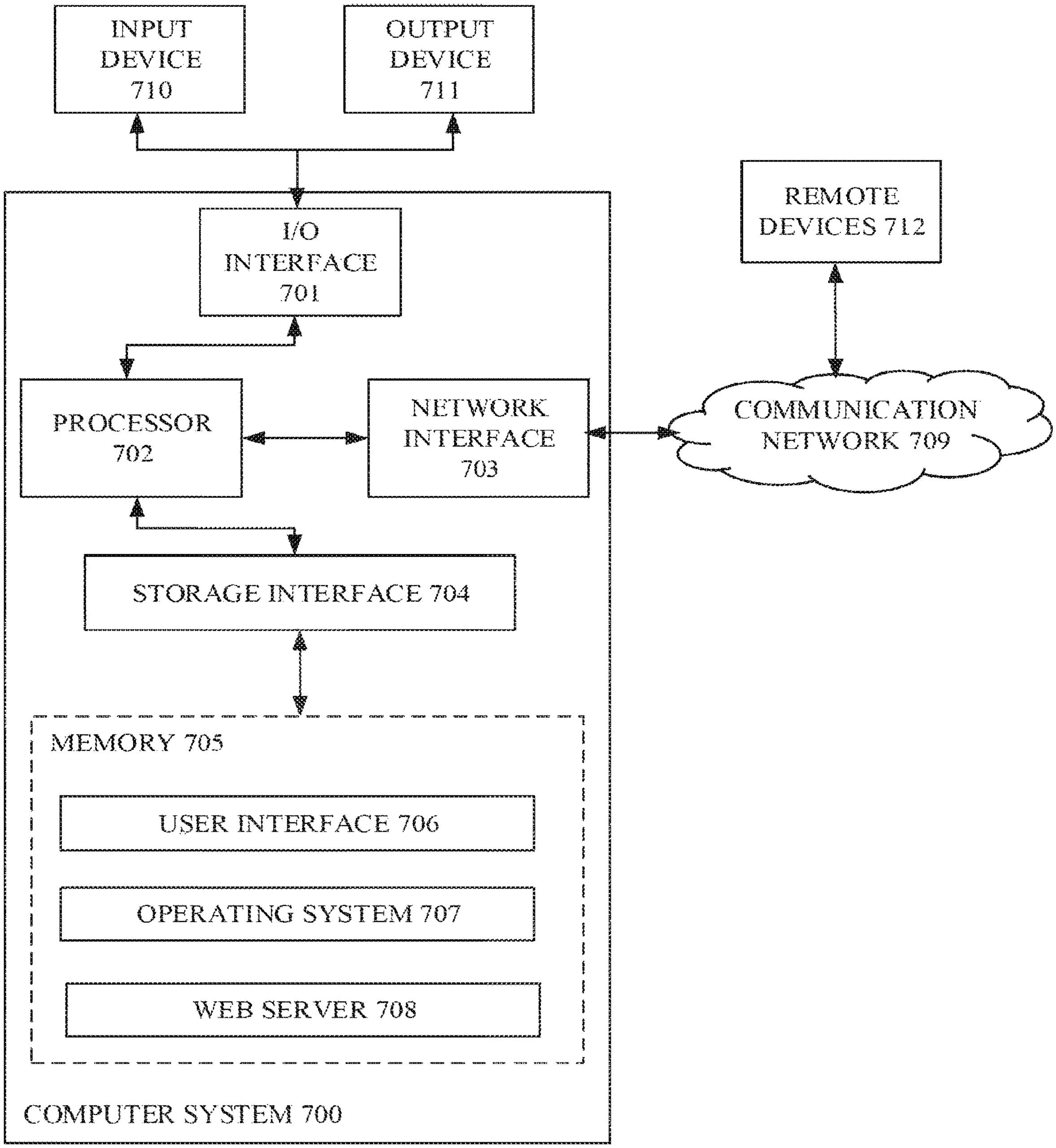
FIG. 7 is a computer system for authenticating digital transactions, in accordance with some non-limiting embodiments or aspects of the present disclosure.

Referring now to FIG. 7, shown is a computer system 700 for authenticating digital transactions, in accordance with some non-limiting embodiments or aspects of the present disclosure. In some non-limiting embodiments or aspects, computer system 700 may be used to implement the method for authenticating digital transactions. Computer system 700 may comprise a central processing unit ("CPU" or "processor") 702. Processor 702 may comprise at least one data processor for executing program components for dynamic resource allocation at run time. Processor 702 may include specialized processing units such as integrated system (bus) controllers, memory management control units, floating point units, graphics processing units, digital signal processing units, etc.

Processor 702 may be disposed in communication with one or more input/output (I/O) devices (not shown) via I/O interface 701. I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

Using I/O interface 701, computer system 700 may communicate with one or more I/O devices. For example, input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device 711 may be a printer, fax machine, video display (e.g., cathode ray tube (CRT), liquid crystal display (LCD), light-emitting diode (LED), plasma, plasma display panel (PDP), organic light-emitting diode display (OLED), or the like), audio speaker, etc.

In some non-limiting embodiments or aspects, computer system 700 may be connected to the service operator through communication network 709. Processor 702 may be disposed in communication with communication network 709 via network interface 703. Network interface 703 may communicate with communication network 709. Network interface 703 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. Communication network 709 may include, without limitation, a direct interconnection, e-commerce network, a P2P network, LAN, WAN, wireless network (e.g., using Wireless Application Protocol), the Internet, Wi-Fi®, etc. Using network interface 703 and communication network 709, computer system 700 may communicate with the one or more service operators.

In some non-limiting embodiments or aspects, processor 702 may be disposed in communication with memory 705 (e.g., RAM, ROM, etc. not shown in FIG. 7) via storage interface 704. Storage interface 704 may connect to memory 705 including, without limitation, memory drives, removable disc drives, etc., employing connection protocols such as serial advanced technology attachment (SATA), Integrated Drive Electronics (IDE), IEEE-1394, USB, fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

Memory 705 may store a collection of program or database components, including, without limitation, user interface 706, operating system 707, web server 708, etc. In some non-limiting embodiments or aspects, computer system 700 may store user/application data, such as the data, variables, records, etc. as described in this disclosure. Such databases may be implemented as fault-tolerant, relational, scalable, secure databases such as Oracle or Sybase.

Operating system 707 may facilitate resource management and operation of computer system 700. Examples of operating systems include, without limitation, APPLE® MACINTOSH® OS X®, UNIX®, UNIX-like system distributions (e.g., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In some non-limiting embodiments or aspects, computer system 700 may implement a web browser (not shown in the figure) stored program component. The web browser (not shown in the figure) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc. In some non-limiting embodiments or aspects, computer system 700 may implement a mail server (not shown in the figure) stored program component. The mail server may be an Internet mail server such as Microsoft Exchange, or the like. The mail server (not shown in the figure) may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some non-limiting embodiments or aspects, computer system 700 may implement a mail client (not shown in the figure) stored program component. The mail client (not shown in the figure) may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMS, Digital Video Disc (DVDs), flash drives, disks, and any other known physical storage media.

In some non-limiting embodiments or aspects, computer system 700 may receive at least one of the device registration request, the enrolment request, the first payment transaction request, the second payment transaction request, and the one or more authentication modes from remote devices 712 via communication network 709.

Figure 8:
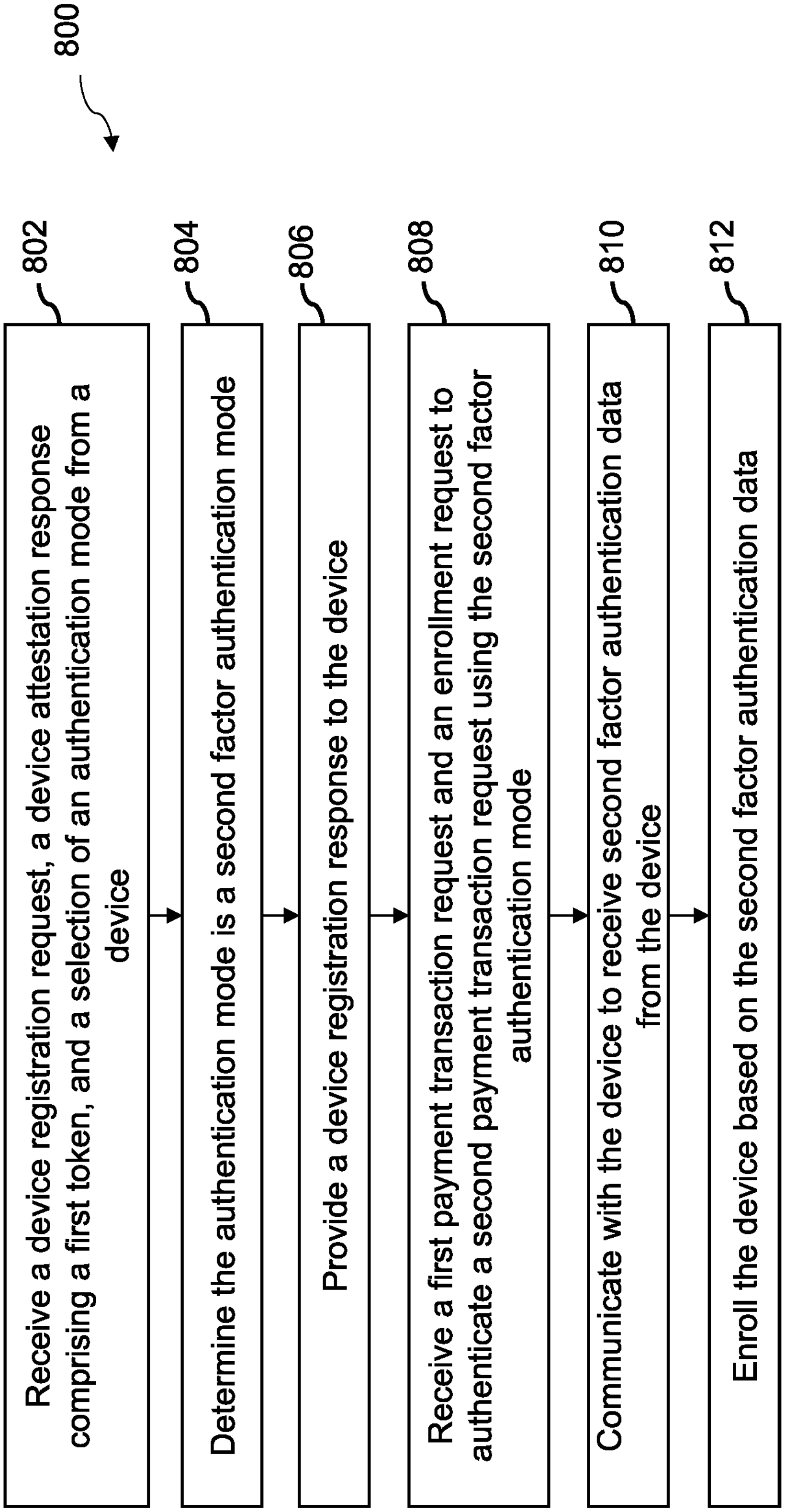
FIG. 8 is a flowchart of a non-limiting embodiment or aspect for enrolling a device to a second factor (e.g., static PIN, etc.) authentication mode for authenticating digital transactions.

Referring now to FIG. 8, shown is a flowchart 800 of a non-limiting embodiment or aspect for enrolling a device to a second factor (e.g., static PIN, etc.) authentication mode for authenticating digital transactions, in accordance with some non-limiting embodiments or aspects of the present disclosure. The order in which the method is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, firmware, or a combination of hardware and software.

As shown in FIG. 8, step 802 includes receiving a device registration request, a device attestation response comprising a first token, and a selection of an authentication mode of a plurality of authentication modes from a device. For example, payment server 105 may receive the device registration request, the device attestation response comprising the first token, and the selection of an authentication mode of a plurality of authentication modes from device 102. In some non-limiting embodiments or aspects, the plurality of authentication modes may include at least one second factor authentication mode, such as a static PIN authentication mode, a biometric authentication mode, and/or the like.

In some non-limiting embodiments or aspects, SDK 102B may provide the device attestation request including at least the first token (or nonce), upon receiving the device registration request including at least the merchant information from application 102A to second server 104. The first token (or nonce) may be generated by SDK 102B using one or more cryptographic techniques. In some non-limiting embodiments or aspects, the first token (or nonce) may be generated by payment server 105 and provided to SDK 102B.

In some non-limiting embodiments or aspects, SDK 102B may receive (e.g., from second server 104) the device attestation response including at least the device integrity status based on the first token (or nonce).

In some non-limiting embodiments or aspects, application 102A may determine whether a token owner identifier of a token exists on device 102. In some non-limiting embodiments or aspects, if the token exists on device 102, application 120A may determine device 102 is eligible to perform repeat transactions (e.g., subsequent transactions). In some non-limiting embodiments or aspects, application 102A may receive an indication that the authentication mode for device 102 is the second factor authentication mode from SDK 102B.

In some non-limiting embodiments or aspects, if the token does not exist on device 102, application 102A may determine that device 102 is being enrolled to the second factor (e.g., static PIN, etc.) authentication mode for authenticating digital transactions for a first time. In some non-limiting embodiments or aspects, if application 102A determines that device 102 is being enrolled to the second factor authentication mode for authentication digital transaction for the first time, application 102 may collect optionality data from device 102. In some non-limiting embodiments or aspects, the optionality data may be provided by the user of device 102, providing consent to enroll device 102 to the second factor authentication mode for authenticating digital transactions.

In some non-limiting embodiments or aspects, prior to initiating a transaction, application 102A may determine whether a cardholder bank identification number (BIN) is applicable for a transaction based on optionality data (e.g., data indicating an enrolment Opt-In selection provided by the user) received from the cardholder. The optionality data may include an indication that a user of device 102 has opted to enroll device 102 to a second factor (e.g., static PIN, etc.) authentication mode for authenticating digital transactions. In some non-limiting embodiments or aspects, application 102A may determine whether the cardholder BIN is applicable for the transaction by performing an API call to a merchant server (e.g., first server 103 and/or second server 104) to check a profile for a personal account number (PAN) corresponding to the merchant card alias.

In some non-limiting embodiments or aspects, upon receiving the device attestation response (e.g., from second server 104), device 102 may provide the device registration request and the device attestation response to payment server 105. For example, the device registration request may include at least one of a merchant card alias, the application identification value, a merchant customer identification value, a mobile number associated with device 102, $\text{encrypted}_{v\_static\_public\_key}$ ($\text{signed}_{device\_private\_key}$ (first token, device_public_key, device key type, device key size, the device attestation response)), and a v_static_public_key reference identification value, where $\text{encrypted}_{v\_static\_public\_key}$ indicates an encryption using one or more cryptographic techniques (e.g., public key encryption) using "v_static_public_key" as a public key associated with payment server 105 and $\text{signed}_{device\_private\_key}$ indicates signing using one or more cryptographic techniques (e.g., public key encryption or digital signature techniques) using "device_private_key" as a private key associated with device 102.

As shown in FIG. 8, step 804 includes determining the authentication mode is one of the second factor authentication mode(s) (e.g., static PIN, etc.). For example, payment server 105 may determine the authentication mode is one of the second factor authentication modes (e.g., the static PIN authentication mode, etc.) based on the selection of the authentication mode of the plurality of authentication modes.

As shown in FIG. 8, step 806 includes, in response to receiving the device registration request and determining that the authentication mode is one of the second factor authentication mode(s) (e.g., the static PIN authentication mode, etc.), providing a device registration response to the device. For example, payment server 105 may provide the device registration response to device 102. In some non-limiting embodiments or aspects, the device registration response may be stored on device 102.

In some non-limiting embodiments or aspects, payment server 105 may provide the device registration response to device 102 based on validating the device attestation response. In some non-limiting embodiments or aspects, validating the device attestation response may include verifying the origin of the device attestation response using one or more cryptographic techniques based on the first token, as described herein.

In some non-limiting embodiments or aspects, in response to a successful validation, payment server 105 may send the device registration response including at least a device identification value to SDK 102B, as described herein. Additionally, or alternatively, in response to an unsuccessful validation, payment server 105 may send the device registration response including at least an error message to SDK 102B. For example, the error message may be indicative of a failure of the device integrity check.

As shown in FIG. 8, step 808 includes receiving a first payment transaction request and an enrolment request to authenticate a second payment transaction request using one of the second factor authentication mode(s) (e.g., the static PIN authentication mode, etc.) from the device. For example, payment server 105 may receive a first payment transaction request and an enrolment request to authenticate a second payment transaction request using the one of the second factor authentication mode(s) (e.g., the static PIN authentication mode, etc.) from device 102.

In some non-limiting embodiments or aspects, application 102 may send at least one of merchant card alias, merchant application identification value, merchant customer identification value, Encrypted$_{v_static_public_key}$ (Signed$_{D_Pvt}$ (first token, device public key, device key type, device key size, SafetyNet Response JWS, etc.)), and/or static public key reference identification value to payment server 105. In some non-limiting embodiments or aspects, application 102A may send Signed$_{D_Pvt}$, device identification value, Opt-In selection data, Encrypted$_{v_static_public_key}$, and/or authorization code to first server 103.

In some non-limiting embodiments or aspects, the enrolment request may be received after first server 103 receives, via application 102A, the enrolment request including at least one of the consent for registering application 102A to the second factor authentication more, the merchant information, the payment amount, and the payment card (or payment token) information. For example, the enrolment request may include PAN (or payment token based thereon), expiry date associated with the payment card (or payment token), CVV2, the payment amount, a type of currency associated with the payment amount, the consent for registering to the second factor authentication mode, the merchant customer identification value, the merchant application identification value, the mobile number associated with device 102, signed$_{device_private_key}$ (device identification value), encrypted$_{v_public_key}$ (authorization code), and merchant card alias.

In some non-limiting embodiments or aspects, upon validation of the payment card (or payment token) information, payment server 105 may provide to application 102 at least one of the payment authentication request and the account identification value. For example, payment server 105 may provide at least one of an ACS URL, the payment authentication request (PAReq), and/or the account identification value to application 102A. In some non-limiting embodiments or aspects, payment server 105 may obtain the ACS URL, the payment authentication request, and the account identification value from the third server (for example, the MPI). In some non-limiting embodiments or aspects, application 102A may initiate the first payment transaction request including the payment authentication request. In some non-limiting embodiments or aspects, payment server 105 may receive the first payment transaction request including at least one of a payment authentication request and a payment authorization request from first server 103 for completing a transaction associated between user 101 and a merchant using at least a payment card (or payment token).

As shown in FIG. 8, step 810 includes communicating with the device to receive second factor authentication data (e.g., a static PIN, biometric data, and/or the like) from the device. For example, payment server 105 may communicate with device 102 to receive the second factor authentication data (e.g., static PIN, etc.) from device 102.

In some non-limiting embodiments or aspects, payment server 105 may provide a second token and a second factor authentication (e.g., PIN, biometric, and/or the like) URL to device 102. The second factor authentication URL may redirect device 102 to a webpage at the second factor authentication URL. The webpage at the second factor authentication URL may prompt a user of device 102 to set the second factor authentication data. The second factor authentication data may be used for repeat transactions.

In some non-limiting embodiments or aspects, payment server 105 may receive the second factor authentication data set by the user of device 102. In some non-limiting embodiments or aspects, enrolling device 102 based on the second factor authentication data includes associating the second factor authentication data with a payment account of the user and providing a third token to the device. For example, payment server 105 may associate the second factor authentication data (e.g., static PIN, etc.) with a payment account of the user and provide a third token to device 102. In some non-limiting embodiments or aspects, providing the third token may include updating a state of the second token and generating the third token based on the second token. The third token may be used to authenticate the second payment transaction. The third token may be associated with the second factor authentication data (e.g., static PIN). For example, payment server 105 may associate the third token with the second factor authentication data.

In some non-limiting embodiments or aspects, payment server 105 may receive the result of the first payment transaction request after facilitating the processing of at least one of a payment authentication request and a payment authorization request based on one or more issuer authentication modes (techniques). For example, the one or more issuer authentication modes (techniques) may be a 3DS technique. The person skilled in the art may appreciate the use of a static password, an OTP, and/or a PIN to process the payment authentication request and generate a second payment authentication response. For example, the second payment authentication response may include the account identification value and the device identification value.

As shown in FIG. 8, step 812 includes enrolling the device based on the second factor authentication data. For example, payment server 105 may enroll device 102 based on the second factor authentication data (e.g., static PIN, etc.).

In some non-limiting embodiments or aspects, enrolling device 102 may include verifying, by payment server 105, the first payment authentication response received from device 102 with the second payment authentication response obtained while facilitating a payment authentication request based on one or more issuer authentication modes (techniques). For example, the first payment authentication response may include signed$_{device_private_key}$ (device identification value), merchant card alias, merchant app ID, merchant customer ID, encrypted$_{v_public_key}$ (signed$_{device_private_key}$ (first payment authentication response)), and encrypted$_{v_public_key}$ (authorization code). In some non-limiting embodiments or aspects, payment server 105 may verify the first payment authentication response and second authentication response by performing a byte-by-byte check and validating the digital signature associated with the first and second payment authentication responses. In some non-limiting embodiments or aspects, payment server 105, in response to the second payment authentication response, may provide CAVV and ECI to first server 103 indicating a successful authentication of the payment card (or payment token). In some non-limiting embodiments or aspects, first server 103 may initiate the payment authorization request including at least one of the account identification value and VCIND (indicating the second factor of authentication mode is used for authenticating the second payment transaction during processing of the payment authorization request). In some non-limiting embodiments or aspects, payment server 105 may facilitate the payment authorization request.

In some non-limiting embodiments or aspects, payment server 105, in response to successful verification, may enroll device 102 and/or application 102A to the second factor authentication mode. In some non-limiting embodiments or aspects, payment server 105 may generate the second token for authenticating the second payment transaction request using the second factor authentication mode, where the generated second token may be provided to SDK 102B via first server 103. For example, the generated second token provided to device 102 may be of the form signed$_{v_private_key}$ (encrypted$_{device_public_key}$ (second token)).

Figure 8A:
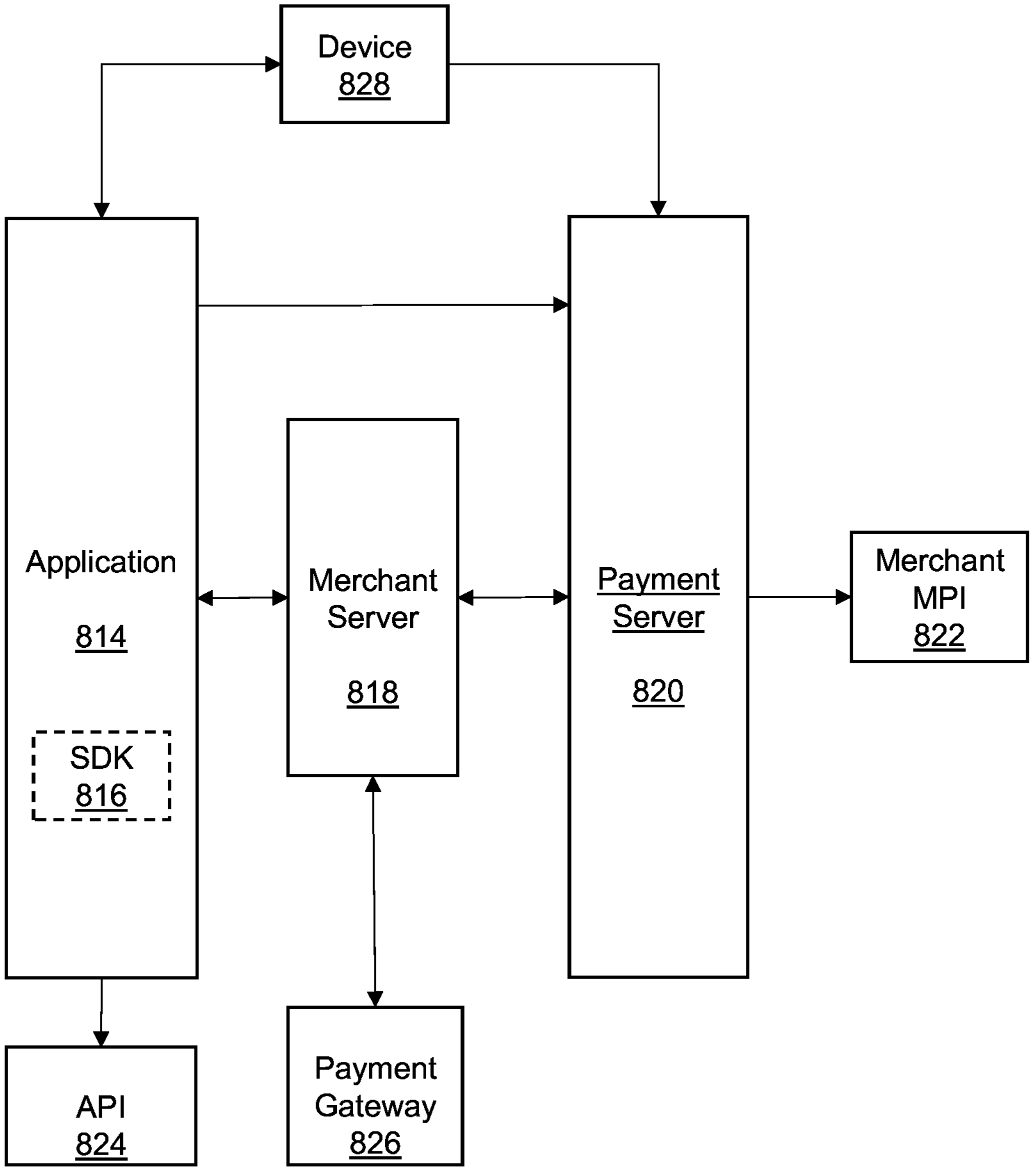
FIGS. 8A and 8B are diagrams of non-limiting embodiments or aspects of an environment for enrolling a device to a second factor (e.g., static PIN, etc.) authentication mode for authenticating digital transactions.
Figure 8B:
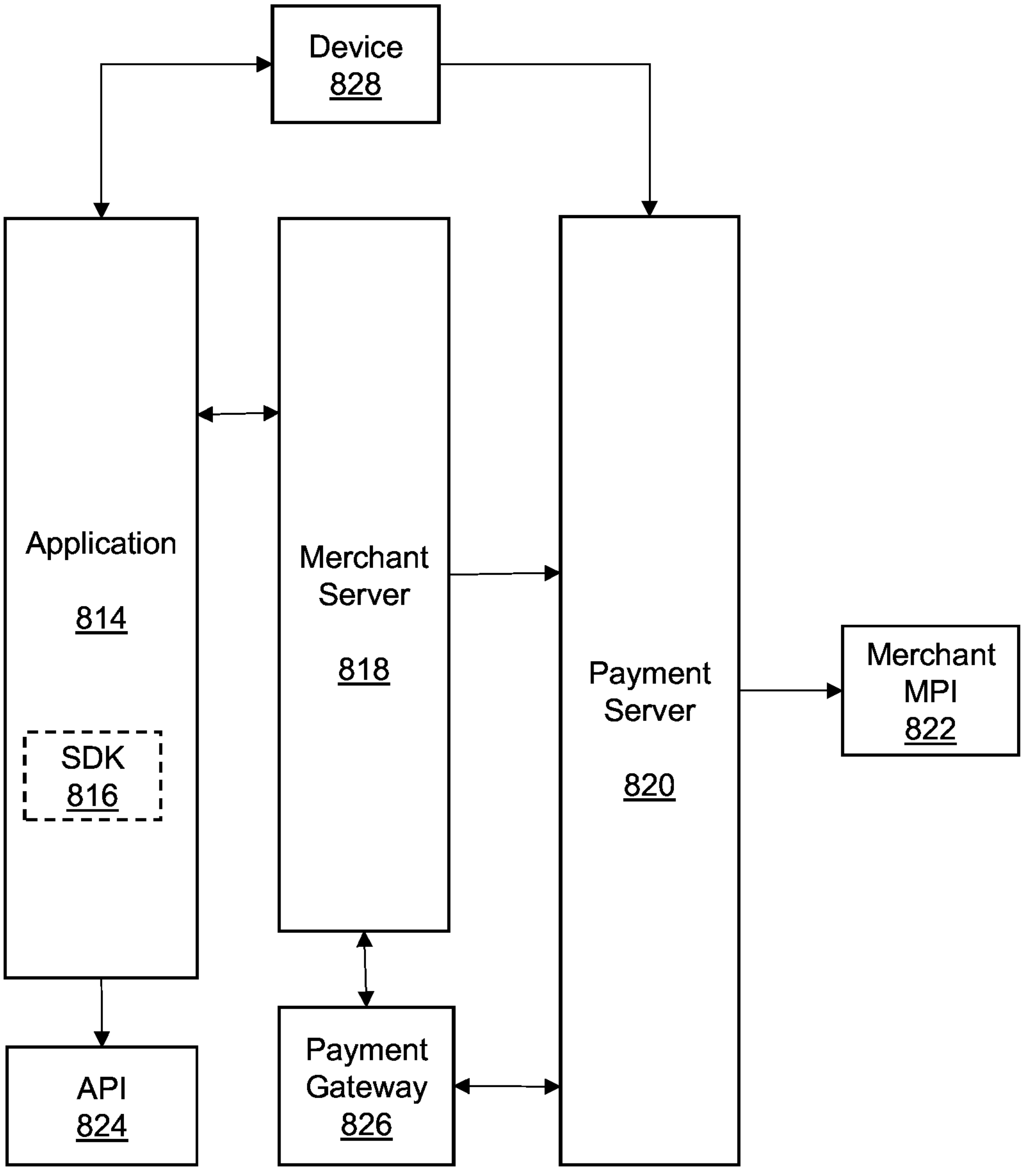

Referring now to FIGS. 8A and 8B, shown are diagrams of non-limiting embodiments or aspects of an environment for enrolling a device to a second factor (e.g., static PIN, etc.) authentication mode for authenticating digital transactions. In some non-limiting embodiments or aspects, application 814 may be the same as, similar to, and/or part of application 102A. In some non-limiting embodiments or aspects, SDK 816 may be the same as, similar to, and/or part of SDK 102B. In some non-limiting embodiments or aspects, merchant server 818 may be the same as, similar to, and/or part of first sever 103 and/or second server 104. In some non-limiting embodiments or aspects, payment server 820 may be the same as, similar to, and/or part of payment server 105.

In some non-limiting embodiments or aspects, application 814 may communicate with (e.g., transmit information to and/or receive information from) SDK 816, merchant server 818, payment server 820, merchant MPI 822, API 824, payment gateway 826, and/or device 828. In some non-limiting embodiments or aspects, application 814 may include SDK 816. In some non-limiting embodiment or aspects, merchant server 818 may communicate with (e.g., transmit information to and/or receive information from) payment server 820 and/or payment gateway 826. In some non-limiting embodiments or aspects, payment server 820 may communicate with (e.g., transmit information to and/or receive information from) merchant MPI 822, and/or payment gateway 826.

In some non-limiting embodiments or aspects, payment server 820 may receive a device registration request, a device attestation response comprising a first token, and a selection of an authentication mode of a plurality of authentication modes from device 828, as described herein.

In some non-limiting embodiments or aspects, payment server 820 may determine the authentication mode is the second factor authentication mode (e.g., static PIN authentication mode, etc.), as described herein.

In some non-limiting embodiments or aspects, in response to receiving the device registration request and/or determining the authentication mode is one of the second factor authentication mode(s) (e.g., static PIN authentication mode, etc.), payment server 820 may provide a device registration response to device 828, as described herein.

In some non-limiting embodiments or aspects, payment server 828 may receive a first payment transaction request and/or an enrolment request to authenticate a second payment transaction request using the second factor authentication mode(s) (e.g., static PIN authentication mode, etc.) from device 828, as described herein.

In some non-limiting embodiments or aspects, payment server 828 may communicate with the device to receive second factor authentication data (e.g., static PIN, biometric data, and/or the like) from device 828, as described here.

In some non-limiting embodiments or aspects, payment server 820 may enroll the device based on the second factor authentication data (e.g., static PIN, etc.), as described here.

Figure 9:
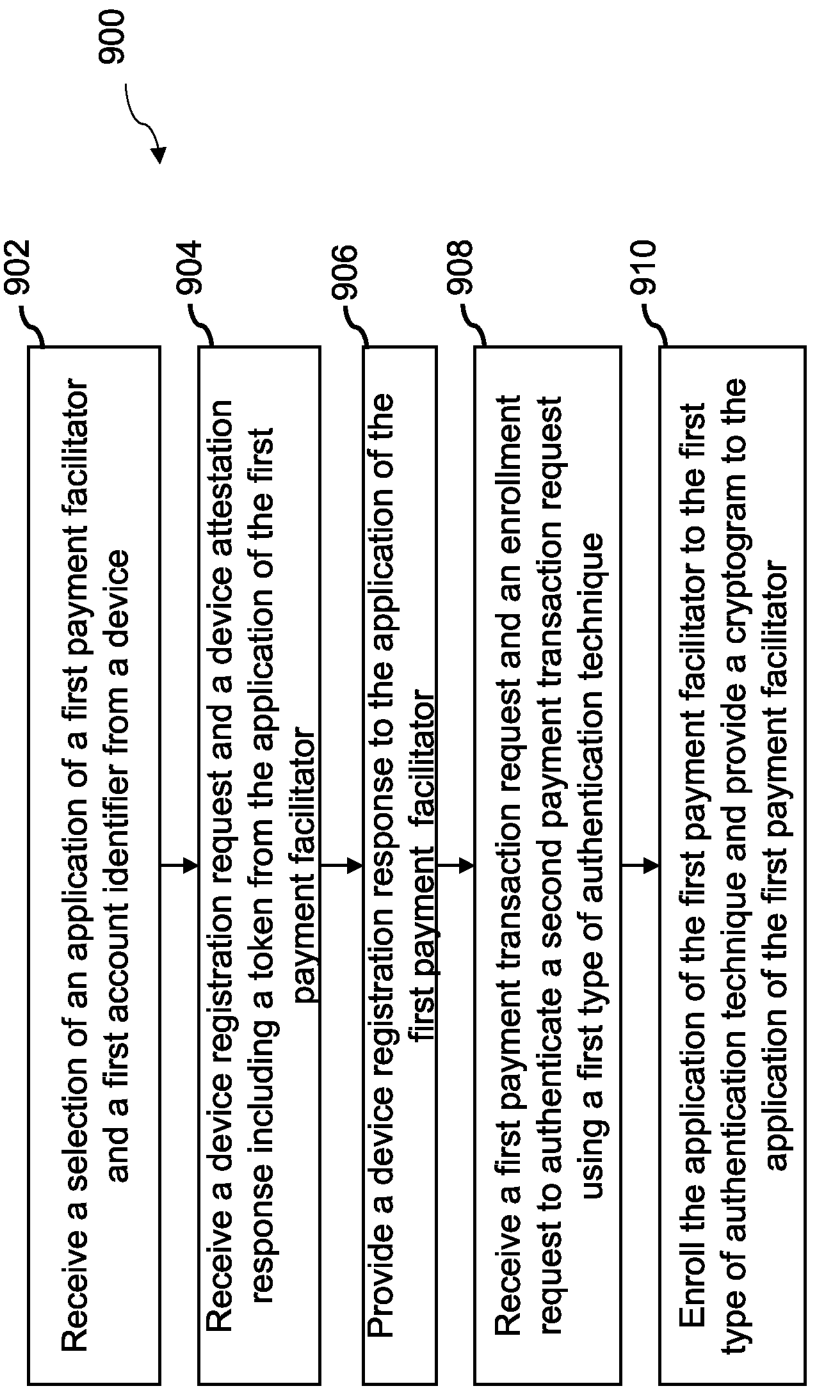
FIG. 9 is a flowchart of a non-limiting embodiment or aspect for selecting an application for authenticating digital transactions.

Referring now to FIG. 9, FIG. 9 is a flowchart 900 of a non-limiting embodiment or aspect for selecting an application for authenticating digital transactions. The order in which the method is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, firmware, or a combination of hardware and software.

As shown in FIG. 9, step 902 includes receiving a selection of an application and/or SDK of a first payment facilitator of a plurality of payment facilitators and a first account identifier of at least one account identifier associated with the payment facilitator from a device. For example, payment server 105 may receive a selection of an application 102A and/or SDK 102B of a first payment facilitator of a plurality of payment facilitators and a first account identifier (e.g., first card-on-file, first payment token, and/or the like) of at least one account identifier associated with the payment facilitator from device 102. For example, device 102 may include a plurality of applications 102A and/or SDKs 102B, each associated with a respective payment facilitator of a plurality of payment facilitators. The user may select one of the applications 102A and/or one of the SDKs 102B within an application 102A and/or select one account identifier (e.g., card-on-file, payment token, and/or the like) within the selected application 102A and/or SDK 102B.

As shown in FIG. 9, step 904 includes, based on the application and/or SDK selection, receiving a device registration request and a device attestation response including a token from the application and/or SDK of the first payment facilitator of the plurality of payment facilitators. For example, payment server 105 may, based on the selection, receive a device registration request and a device attestation response including a token from application 102A and/or SDK 102B of the first payment facilitator of the plurality of payment facilitators. In some non-limiting embodiments or aspects, the token is sent by first server 103 to second server 104, and wherein, in response to receiving the token from first server 103, second server 104 sends device information to first server 103. In some non-limiting embodiments or aspects, payment server 105 may generate the token. The token may include a plurality of token features. The plurality of token features may include at least a token owner identifier. In some non-limiting embodiments or aspects, payment server 105 may set the token owner identifier of the token to match an identifier associated with the first payment facilitator of the plurality of payment facilitators. In some non-limiting embodiments or aspects, after setting the token owner identifier to match the identifier associated with the first payment facilitator of the plurality of payment facilitators, the token can only be used by application 102A and/or SDK 102B of the first payment facilitator of the plurality of payment facilitators (e.g., cannot be used by other applications and/or SDKs on device 102).

As shown in FIG. 9, step 906 includes, in response to the device registration request, providing a device registration response to the application and/or SDK of the first payment facilitator of the plurality of payment facilitators. For example, payment server 105 may, in response to the device registration request, provide a device registration response to the application 102A and/or SDK 102B of the first payment facilitator of the plurality of payment facilitators. In some non-limiting embodiments or aspects, the device registration response may be stored by the application 102A and/or SDK 102B of the first payment facilitator of the plurality of payment facilitators.

As shown in FIG. 9, step 908 includes receiving, from the application and/or SDK of the first payment facilitator of the plurality of payment facilitators, a first payment transaction request and an enrolment request to authenticate a second payment transaction request using a first type of authentication mode. For example, payment server 105 may receive, from the application 102A and/or SDK 102B of the first payment facilitator of the plurality of payment facilitators, a first payment transaction request and an enrolment request to authenticate a second payment transaction request using a first type of authentication mode.

As shown in FIG. 9, step 910 includes enrolling the application and/or SDK of the first payment facilitator of the plurality of payment facilitators to the first type of authentication mode and providing a cryptogram to the application and/or SDK of the first payment facilitator of the plurality of payment facilitators based on a result of the first payment transaction request. For example, payment server 105 may enroll the application 102A and/or SDK 102B of the first payment facilitator of the plurality of payment facilitators to the first type of authentication mode and provide a cryptogram to the application 102A and/or SDK 102B of the first payment facilitator of the plurality of payment facilitators based on a result of the first payment transaction request. In some non-limiting embodiments or aspects, the cryptogram may be used for authenticating the second payment transaction request.

In some non-limiting embodiments or aspects, the first payment facilitator of the plurality of payment facilitators may generate a private key and a public key. The private key may be stored by the application 102A and/or SDK 102B of the first payment facilitator of the plurality of payment facilitators on first server 103. The public key may be stored by an issuer on the issuer server 106. In some non-limiting embodiments or aspects, providing the cryptogram may include generating the cryptogram based on the private key. The cryptogram may be signed by the first payment facilitator of the plurality of payment facilitators. In some non-limiting embodiments or aspects, authenticating the second payment transactions may include: verifying that the token owner identifier of the token matches an identifier associated with the first payment facilitator of the plurality of payment facilitators based on the cryptogram, and authenticating the second payment transaction request based on the cryptogram.

In some non-limiting embodiments or aspects, a token owner may be a merchant (e.g., the merchant who is the on file owner of the card being used for the transaction, the merchant driving the enrolment) and may be the designated owner of the provisioned token.

In some non-limiting embodiments or aspects, a merchant may generate a list of a plurality of merchant identification values owned by the merchant and a mapping table of the plurality of merchant identification values owned by the merchant. In some non-limiting embodiments or aspects, the token owner may generate a key pair (e.g., the public key and the private key) and the token owner may share the public key with payment server 105 which may associate the public key with the token owner identifier and store the associated public key and token owner identifier in a storage of payment server 105. In some non-limiting embodiments or aspects, the token owner may sign the cryptogram using the private key for the second payment transaction. In some non-limiting embodiments or aspects, the payment server may verify the signed cryptogram by fetching the public key based on the token owner. In some non-limiting embodiments or aspects, the cryptogram may be generated as part of the second payment transaction request.

Figure 9A:
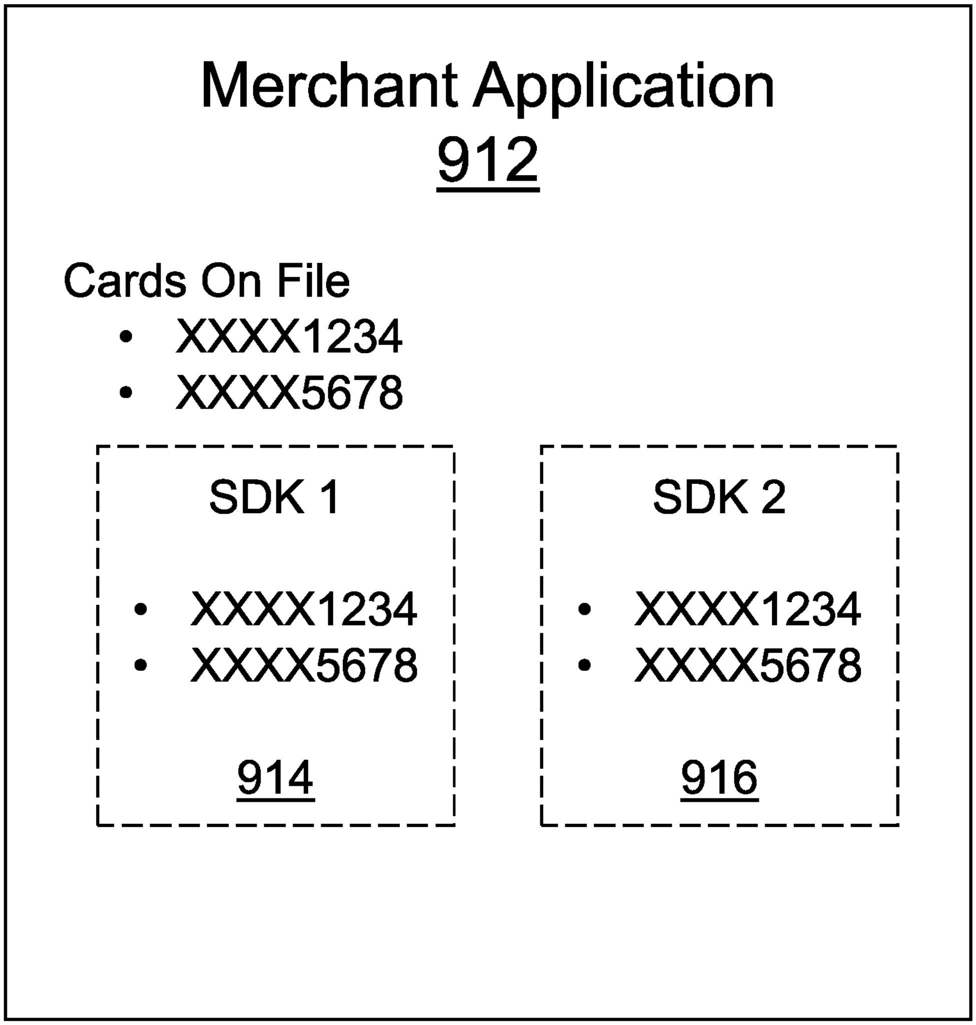
FIGS. 9A and 9B are diagrams of non-limiting embodiments or aspects of an application for authenticating digital transactions.
Figure 9B:
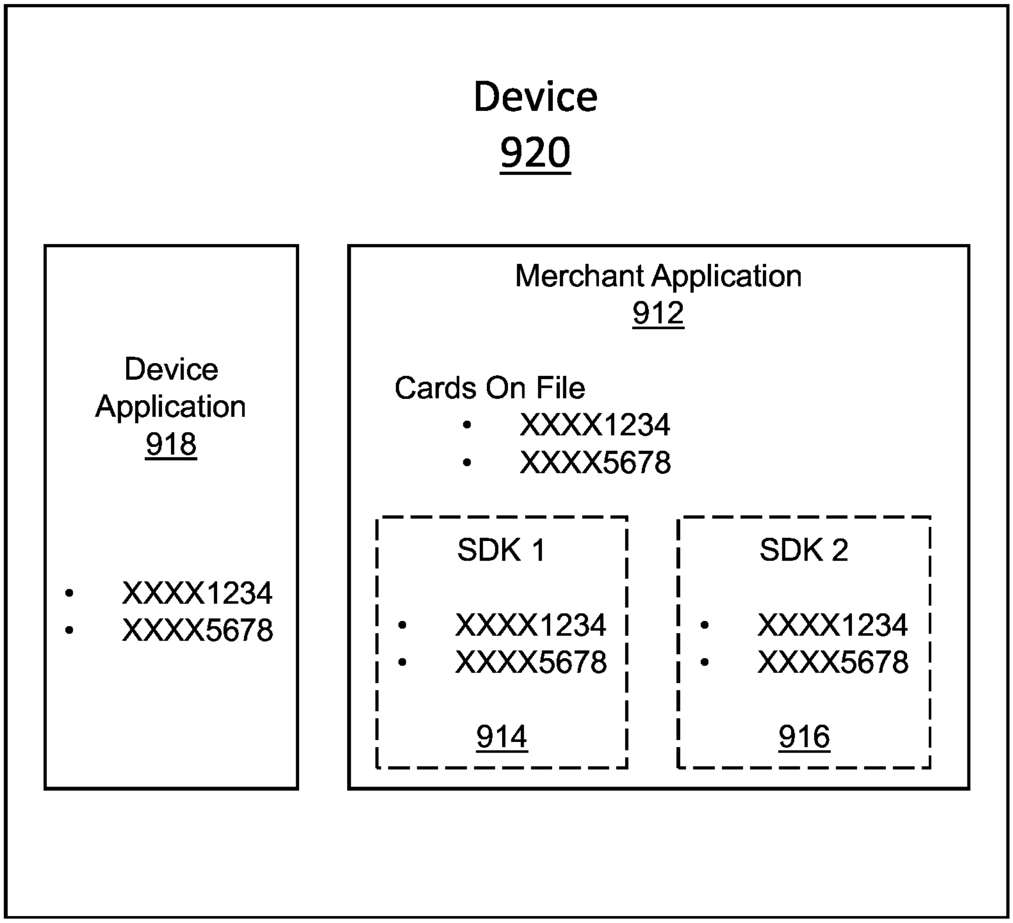

Referring to FIGS. 9A and 9B, shown are diagrams of non-limiting embodiments or aspects of an application for authenticating digital transactions.

In some non-limiting embodiments or aspects, merchant application 912 and/or device application 918 may be the same as, similar to, and/or part of application 102A and/or application 814. In some non-limiting embodiments or aspects, SDK 1 914 and/or SDK 2 916 may be the same as, similar to, and/or part of SDK 102B and/or SDK 816. In some non-limiting embodiments or aspects, device 920 may be the same as, similar to, and/or part of device 102 and/or device 828.

In some non-limiting embodiments or aspects, merchant application 912 may be associated with a first payment facilitator. In some non-limiting embodiments or aspects, merchant application 912 may store a plurality of cards on file (e.g., XXXX1234 or XXXX5678).

In some non-limiting embodiments or aspects, merchant application 912 may store and/or support a plurality of SDKs 914, 916. In some non-limiting embodiments or aspects, each of the plurality of SDKs 914, 916 may be associated with a payment facilitator of a plurality of payment facilitators. For example, SDK 1 914 may be associated with a first payment facilitator and SDK 2 916 may be associated with a second payment facilitator. In some non-limiting embodiments or aspects, the plurality of SDKs 914, 916 may store the plurality of cards on file (e.g., XXXX1234 or XXXX5678).

As shown in FIG. 9B, a plurality of applications (e.g., software applications) may be installed on device 920, including, but not limited to, merchant application 912 and/or device application 918. In some non-limiting embodiments or aspects, device application 918 may store the plurality of cards on file (e.g., XXXX1234 or XXXX5678).

In some non-limiting embodiments or aspects, a payment server may receive a selection, as described herein. In some non-limiting embodiments or aspects, the selection may include a selection of merchant application 912. In some non-limiting embodiments or aspects, the selection may include a selection of an SDK (e.g., SDK 1 914) of the plurality of SDKs 914, 916 stored by merchant application 912. In some non-limiting embodiments or aspects, the selection may include a first account identifier (e.g., XXXX1234) stored by SDK 1 914.

In some non-limiting embodiments or aspects, based on the selection, the payment server may receive a device registration request and a device attestation response including a token from the application and/or SDK of the first payment facilitator of the plurality of payment facilitators (e.g., SDK 1 914), as described herein.

In some non-limiting embodiments or aspects, in response to receiving the device registration request, the payment server may provide a device registration response to the application and/or SDK of the first payment facilitator of the plurality of payment facilitators (e.g., SDK 1 914), as described herein.

In some non-limiting embodiments or aspects, the payment server may receive from the application and/or SDK of the first payment facilitator of the plurality of payment facilitators (e.g., SDK 1 914), a first payment transaction request and an enrolment request to authenticate a second payment transaction request using a first type of authentication mode, as described herein.

In some non-limiting embodiments or aspects, the payment server may enroll the application and/or SDK of the first payment facilitator of the plurality of payment facilitators (e.g., SDK 1) to the first type of authentication mode and provide a cryptogram to the application and/or SDK of the first payment facilitator of the plurality of payment facilitators (e.g., SDK 1) based on a result of the first payment transaction request, as described herein.

In some non-limiting embodiments or aspects, an SDK (e.g., SDK 1 914) of the plurality of SDKs (914, 916) may be chosen (e.g., dynamically) to enroll to the first type of authentication mode and receive the cryptogram of a first payment transaction request. In some non-limiting embodiments or aspects, subsequent transactions made via merchant application 912 may use any one of the SDKs of the plurality of SDKs supported by merchant application 912 (e.g., SDK 1 914 and/or SDK 2 916) to complete a subsequent transaction, regardless of which SDK of the plurality of SDKs was previously enrolled.

Figure 10:
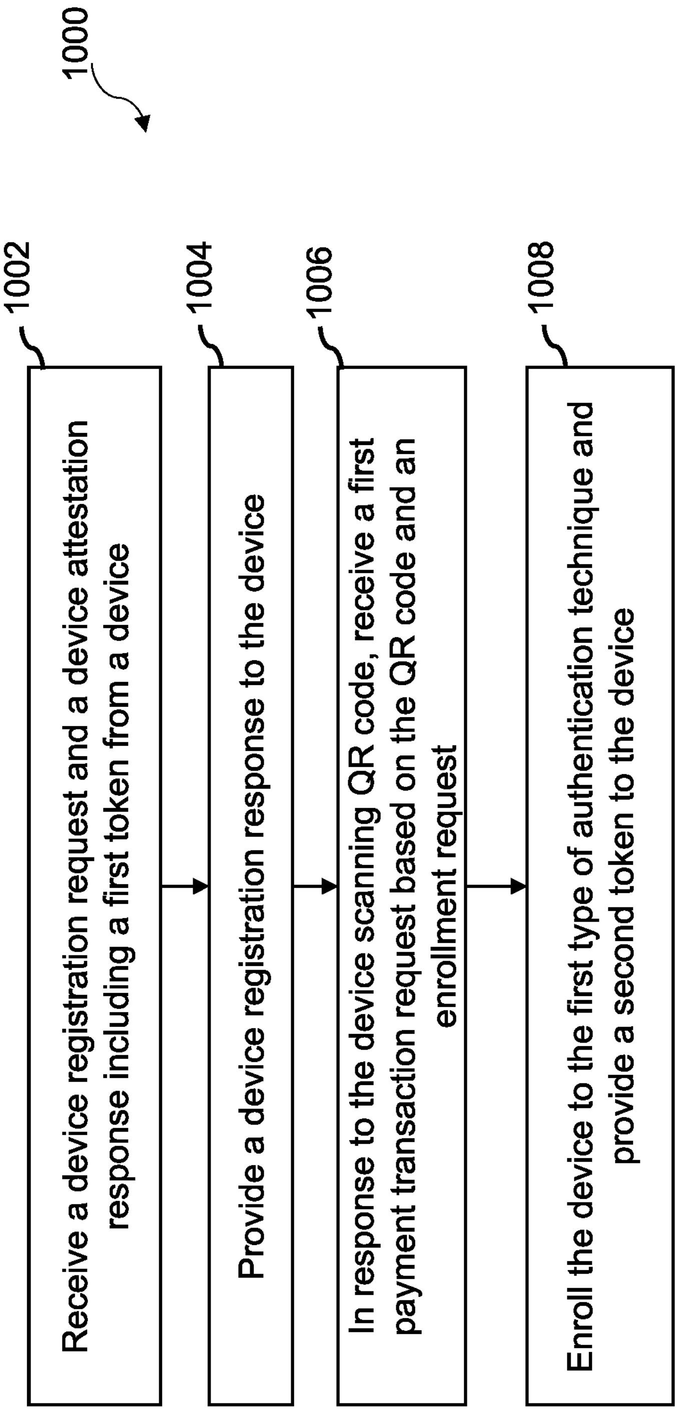
FIG. 10 shows a flowchart of a non-limiting embodiment or aspect for using a QR code for authenticating digital transactions.

Referring now to FIG. 10, FIG. 10 is a flowchart of a non-limiting embodiment or aspect for using a QR code for authenticating digital transactions, in accordance with some non-limiting embodiments or aspects of the present disclosure. The order in which the method is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, firmware, or a combination of hardware and software.

As shown in FIG. 10, step 1002 includes receiving a device registration request and a device attestation response including a first token from a device. For example, payment server 105 may receive a device registration request and a device attestation response including a first token from device 102.

In some non-limiting embodiments or aspects, the first token is sent by a first server to a second server. Additionally, or alternatively, in response to receiving the first token from the first server, the second server sends device information to the first server.

As shown in FIG. 10, step 1004 includes, in response to the device registration request, providing a device registration response to the device. For example, payment server 105 may, in response to the device registration request, provide a device registration response to device 102. Device 102 may store the registration response on the device.

As shown in FIG. 10, step 1006 includes receiving a first payment transaction request based on a QR code and an enrolment request to authenticate a second payment transaction request using a first type of authentication mode. For example, in response to device 102 scanning a QR code by a QR code scanning application on device 102, payment server 105 may receive, from device 102, a first payment transaction request based on the QR code and an enrolment request to authenticate a second payment transaction request using a first type of authentication mode.

In some non-limiting embodiments or aspects, device 102 may scan and/or capture data from a QR code. In some non-limiting embodiments or aspects, the QR code may be one of a Bharat QR (BQR) code, a Proprietary/Native QR (PQR) code, a UPI QR code, and/or a Proprietary/Native QR and UPI QR code.

As shown in FIG. 10, step 1008 includes enrolling the device to the first type of authentication mode and providing a second token to the device based on a result of the first payment transaction request. For example, payment server 105 may enroll device 102 to the first type of authentication mode and provide a second token to device 102 based on a result of the first payment transaction request. In some non-limiting embodiments or aspects, the second token may be used for authenticating the second payment transaction request initiated in response to device 102 scanning a second QR code by the QR code scanning application.

In some non-limiting embodiments or aspects, authenticating the second payment transaction request may include: in response to device 102 scanning the second QR code by the QR code scanning application, receiving, by payment server 105, the second payment transaction request based on the second QR code; in response to receiving the second payment transaction request, communicating, by payment server 105, with an authentication server (e.g., second server 104) based on the second token; receiving, by payment server 105, an account identifier associated with the second token from the authentication server; and processing, by payment server 105, the second payment transaction request based on the account identifier. In some non-limiting embodiments or aspects, the account identifier may be communicated from the authentication server to payment server 105 without additional communications (e.g., 3DS communications, second factor authentication communications, communications to a payment facilitator server (e.g., first server 103), etc.).

Figure 10A:
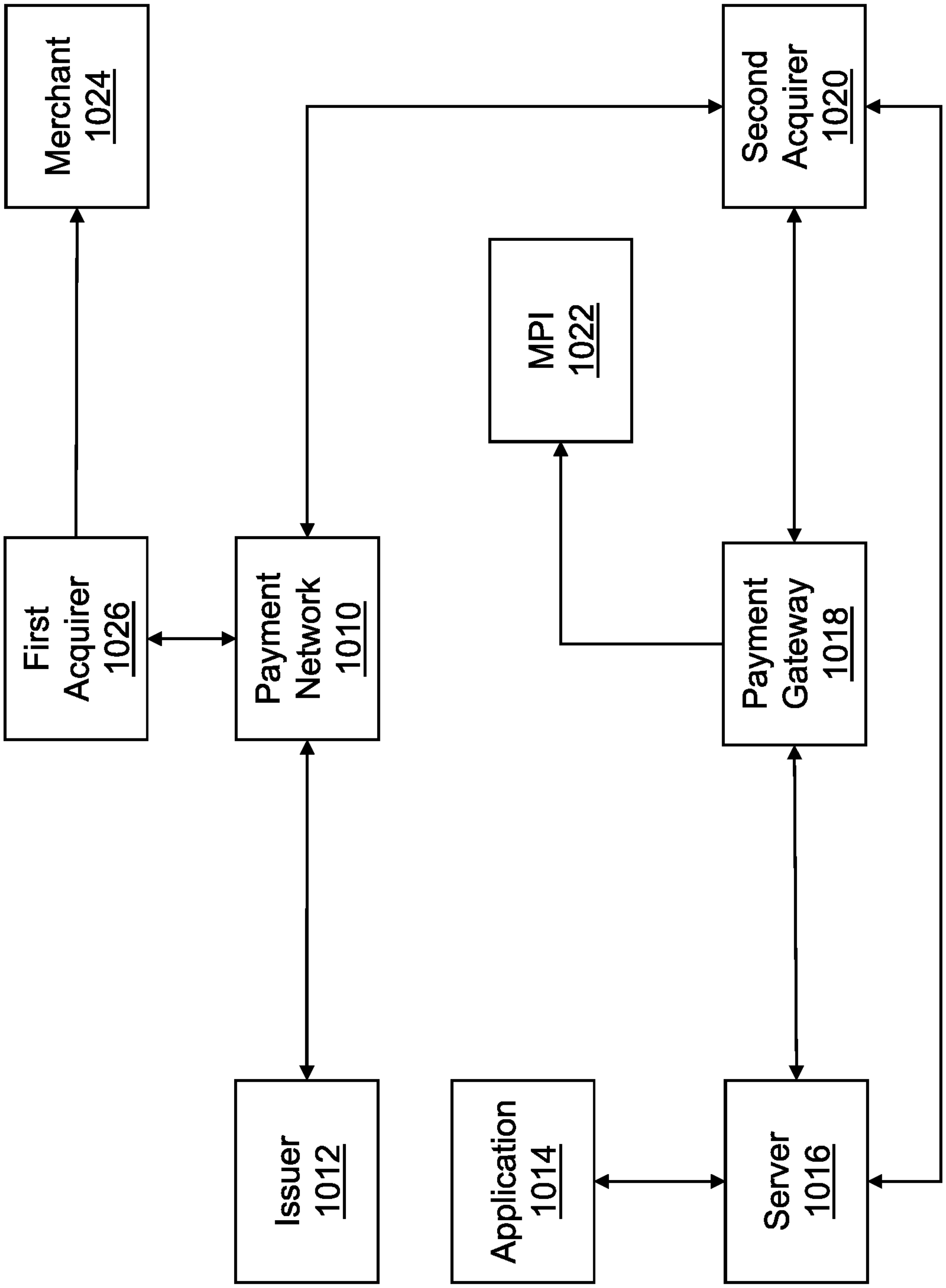
FIGS. 10A and 10B are diagrams of non-limiting embodiments or aspects for using a QR code for authenticating digital transactions.
Figure 10B:
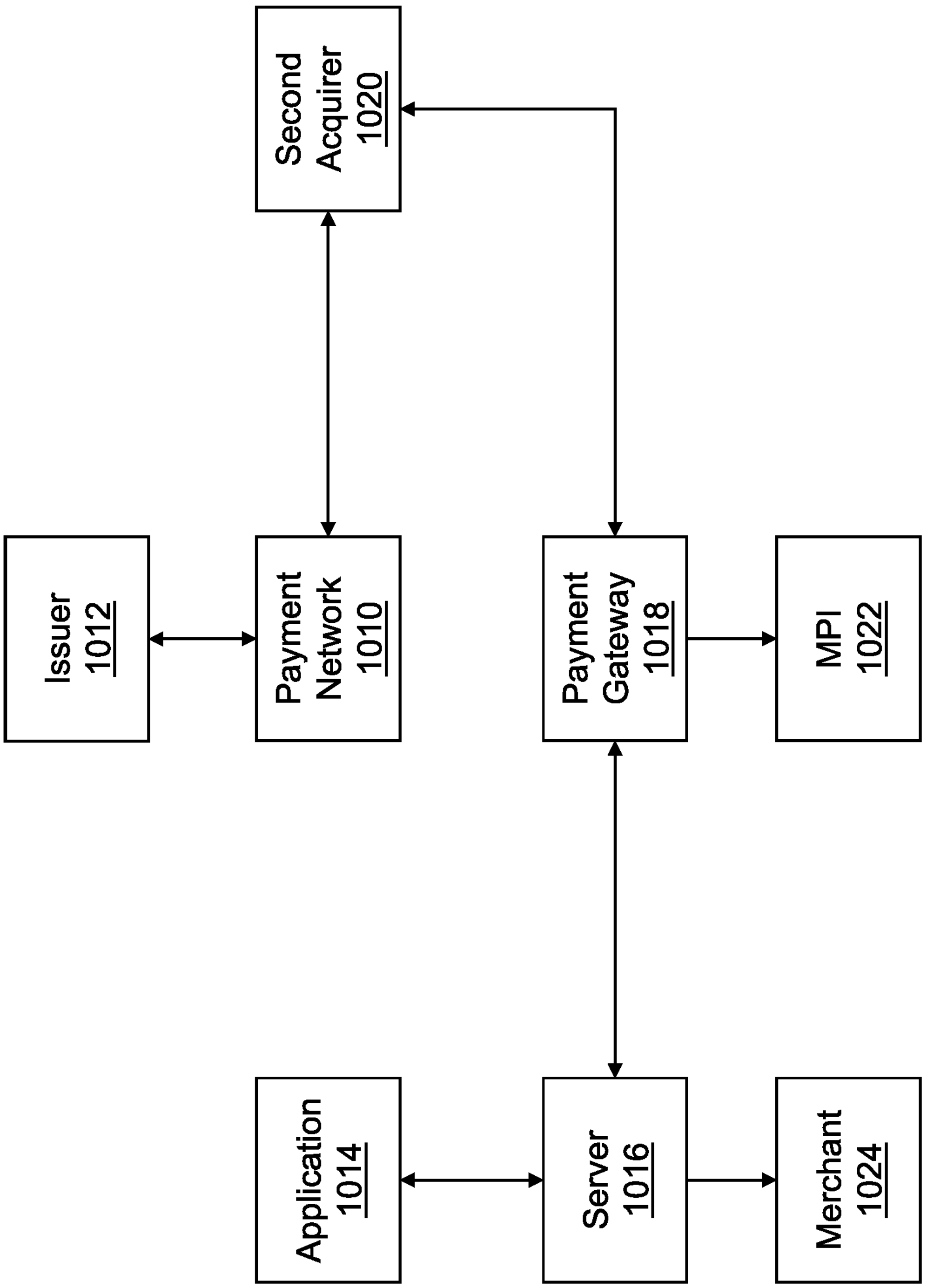

Referring now to FIGS. 10A and 10B are a diagram of a non-limiting embodiment or aspect for using a QR code (e.g., a BQR code, a PQR code, and/or a URI QR Code) for authenticating digital transactions. In some non-limiting embodiments or aspects, payment network 1010 may be the same as, similar to, and/or part of payment server 105 and/or 820. In some non-limiting embodiments or aspects, issuer 1012 may be the same as, similar to, and/or part of issuer server (106 A-N). In some non-limiting embodiments or aspects, application (114) may be the same as, similar to, and/or part of application 102A, 814 and/or 912. In some non-limiting embodiments or aspects, server 116 may be the same as, similar to, and/or part of first server 103, second server 104, payment server 105, merchant server 818 and/or payment server 820. In some non-limiting embodiments or aspects, payment gateway 1018 may be the same as, similar to, and/or part of payment gateway 826. In some non-limiting embodiments or aspects, MPI 1022 may be the same as, similar to, and/or part of merchant MPI 822. In some non-limiting embodiments or aspects, merchant 1024 may be a merchant of a plurality of merchants. In some non-limiting embodiments or aspects, first acquirer 1026 and/or second acquirer 1020 may be a merchant acquirer and/or a payment facilitator acquirer.

In some non-limiting embodiments or aspects, payment network 1010 may communicate with (e.g., transmit information to and/or receive information from) issuer 1012, first acquirer 1026 and/or second acquirer 1020. In some non-limiting embodiments or aspects, application 1014 may communicate with (e.g., transmit information to and/or receive information from) server 1016. In some non-limiting embodiments or aspects, server 1016 may communicate with (e.g., transmit information to and/or receive information from) application 1014, payment gateway 1018, and/or second acquirer 1020. In some non-limiting embodiments or aspects, payment gateway 1018 may communicate with (e.g., transmit information to and/or receive information from) server 1016, second acquirer 1020, and/or MPI 1022. In some non-limiting embodiments or aspects, merchant 1024 may communicate with (e.g., transmit information to and/or receive information from) first acquirer (126).

In some non-limiting embodiments or aspects, server 1016 may receive a device registration request and a device attestation response including a first token from application 1014, as described herein.

In some non-limiting embodiments or aspects, in response to receiving the device registration request, server 1016 may provide a device registration response to application 1014, as described herein.

In some non-limiting embodiments or aspects, in response to scanning the QR code by a QR code scanning application 1014 on the device, the server 1016 may receive, from the application 1014, a first payment transaction request based on the QR code and an enrolment request to authenticate a second payment transaction request using a first type of authentication mode, as described herein.

In some non-limiting embodiments or aspects, server 1016 may enroll the device to the first type of authentication mode and provide a second token to the device based on a result of the first payment transaction request, as described herein.

Finally, the language used in the specification has been principally selected for readability and instructional purposes, and it may not have been selected to delineate or circumscribe the inventive subject matter. It is, therefore, intended that the scope of the disclosure be limited not by this detailed description, but rather by any claims that issue on an application based hereon.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:

sending, by a device via a web browser, a device attestation request comprising a first token to a server;

in response to sending the device attestation request, receiving, by the device via the web browser, a device attestation response based on the first token from the server, the device attestation response comprising a device integrity status of the device comprising an indication of tampering in the operating system of the device, wherein the indication of tampering is determined based on whether there is at least one of an emulator or a custom read-only memory on the device;

receiving, by at least one payment server, a device registration request, the device attestation response based on the first token, and a selection of an authentication mode of a plurality of authentication modes from the device via the web browser, wherein the plurality of authentication modes comprises at least one second factor authentication mode;

validating, by the at least one payment server, the device attestation response by verifying an origin of the device attestation response using a digital signature technique based on the first token;

verifying, by the at least one payment server, the device integrity status of the device based on validating the device attestation response;

determining, by the at least one payment server, the authentication mode is the at least one second factor authentication mode based on the selection of the authentication mode of the plurality of authentication modes;

in response to validating the device attestation response, verifying the integrity status of the device, and determining that the authentication mode is the at least one second factor authentication mode, providing, by the at least one payment server, a device registration response to the device via the web browser, wherein the device registration response is stored on the device;

receiving, by the at least one payment server, a first payment transaction request and an enrolment request to authenticate a second payment transaction request using the one of the at least one second factor authentication mode from the device via the web browser;

communicating, by the at least one payment server, with the device via the web browser to receive second factor authentication data from the device via the web browser, wherein communicating with the device to receive the second factor authentication data comprises:

providing a second token and a second factor authentication uniform resource locator (URL) to the device via the web browser, wherein the second factor authentication URL redirects the web browser to a webpage at the second factor authentication URL, wherein the webpage prompts a user of the device to set the second factor authentication data, wherein the second factor authentication data is used for repeat transactions; and receiving the second factor authentication data set by the user of the device; and enrolling, by the at least one payment server, the device based on the second factor authentication data, wherein enrolling the device based on the second factor authentication data comprises:

associating the second factor authentication data with a payment account of the user;

updating a state of the second token to provide an updated second token based on having received the second factor authentication data and the device registration request;

generating a third token based on the updated second token;

associating the third token with the second factor authentication data; and providing the third token to the device via the web browser, wherein the third token is used for subsequent transactions on the device via the web browser without the need for the user to provide second factor authentication data for the subsequent transactions.

2. The computer-implemented method of claim 1, wherein the at least one second factor authentication mode comprises a static personal identification number (PIN) authentication mode, wherein determining the authentication mode is one of the at least one second factor authentication mode comprises determining the authentication mode is the static PIN authentication mode based on the selection of the authentication mode of the plurality of authentication modes, wherein the enrolment request to authenticate the second payment transaction request using the one of the at least one second factor authentication mode comprises a first enrolment request to authenticate the second payment transaction request using the static PIN authentication mode, wherein communicating with the device to receive the second factor authentication data comprises communicating with the device to receive a static PIN, and wherein enrolling the device comprises enrolling the device based on the static PIN.

3. A system comprising:

a device configured to:

send, via a web browser, a device attestation request comprising a first token to a server; and in response to sending the device attestation request, receive, via the web browser, a device attestation response based on the first token from the server, the device attestation response comprising a device integrity status of the device comprising an indication of tampering in the operating system of the device, wherein the indication of tampering is determined based on whether there is at least one of an emulator or a custom read-only memory on the device; and at least one payment server configured to:

receive a device registration request, the device attestation response based on the first token, and a selection of an authentication mode of a plurality of authentication modes from the device via the web browser, wherein the plurality of authentication modes comprises at least one second factor authentication mode;

validate the device attestation response by verifying an origin of the device attestation response using a digital signature technique based on the first token;

verify the device integrity status of the device based on validating the device attestation response;

determine the authentication mode is one of the at least one second factor authentication mode based on the selection of the authentication mode of the plurality of authentication modes;

in response to validating the device attestation response, verifying the integrity status of the device, and determining that the authentication mode is the at least one second factor authentication mode, provide a device registration response to the device via the web browser, wherein the device registration response is stored on the device;

receive a first payment transaction request and an enrolment request to authenticate a second payment transaction request using the one of the at least one second factor authentication mode from the device via the web browser;

communicate with the device via the web browser to receive second factor authentication data from the device via the web browser, wherein communicating with the device to receive the second factor authentication data comprises:

providing a second token and a second factor authentication uniform resource locator (URL) to the device via the web browser, wherein the second factor authentication URL redirects the web browser to a webpage at the second factor authentication URL, wherein the webpage prompts a user of the device to set the second factor authentication data, wherein the second factor authentication data is used for repeat transactions; and receiving the second factor authentication data set by the user of the device; and enroll the device based on the second factor authentication data, wherein enrolling the device based on the second factor authentication data comprises:

associating the second factor authentication data with a payment account of the user;

updating a state of the second token to provide an updated second token based on having received the second factor authentication data and the device registration request;

generating a third token based on the updated second token;

associating the third token with the second factor authentication data; and providing the third token to the device via the web browser, wherein the third token is used for subsequent transactions on the device via the web browser without the need for the user to provide second factor authentication data for the subsequent transactions.

4. The system of claim 3, wherein the at least one second factor authentication mode comprises a static personal identification number (PIN) authentication mode, wherein determining the authentication mode is one of the at least one second factor authentication mode comprises determining the authentication mode is the static PIN authentication mode based on the selection of the authentication mode of the plurality of authentication modes, wherein the enrolment request to authenticate the second payment transaction request using the one of the at least one second factor authentication mode comprises a first enrolment request to authenticate the second payment transaction request using the static PIN authentication mode, wherein communicating with the device to receive the second factor authentication data comprises communicating with the device to receive a static PIN, and wherein enrolling the device comprises enrolling the device based on the static PIN.

5. A computer program product comprising at least one non-transitory computer readable medium comprising one or more instructions that, when executed, cause at least one processor to:

send, by a device via a web browser, a device attestation request comprising a first token to a server;

in response to sending the device attestation request, receive, by the device via the web browser, a device attestation response based on the first token from the server, the device attestation response comprising a device integrity status of the device comprising an indication of tampering in the operating system of the device, wherein the indication of tampering is determined based on whether there is at least one of an emulator or a custom read-only memory on the device;

receive, by at least one payment server, a device registration request, the device attestation response based on the first token, and a selection of an authentication mode of a plurality of authentication modes from the device via the web browser, wherein the plurality of authentication modes comprises at least one second factor authentication mode;

validate, by the at least one payment server, the device attestation response by verifying an origin of the device attestation response using a digital signature technique based on the first token;

verify, by the at least one payment server, the device integrity status of the device based on validating the device attestation response;

determine, by the at least one payment server, the authentication mode is one of the at least one second factor authentication mode based on the selection of the authentication mode of the plurality of authentication modes;

in response to validating the device attestation response, verify the integrity status of the device, and determining that the authentication mode is the one of the at least one second factor authentication mode, provide, by the at least one payment server, a device registration response to the device via the web browser, wherein the device registration response is stored on the device;

receive, by the at least one payment server, a first payment transaction request and an enrolment request to authenticate a second payment transaction request using the one of the at least one second factor authentication mode from the device via the web browser;

communicate, by the at least one payment server, with the device via the web browser to receive second factor authentication data from the device via the web browser, wherein communicating with the device to receive the second factor authentication data comprises:

providing a second token and a second factor authentication uniform resource locator (URL) to the device via the web browser, wherein the second factor authentication URL redirects the web browser to a webpage at the second factor authentication URL, wherein the webpage prompts a user of the device to set the second factor authentication data, wherein the second factor authentication data is used for repeat transactions; and receiving the second factor authentication data set by the user of the device; and enroll, by the at least one payment server, the device based on the second factor authentication data, wherein enrolling the device based on the second factor authentication data comprises:

associating the second factor authentication data with a payment account of the user;

updating a state of the second token to provide an updated second token based on having received the second factor authentication data and the device registration request;

generating a third token based on the updated second token;

associating the third token with the second factor authentication data; and providing the third token to the device via the web browser, wherein the third token is used for subsequent transactions on the device via the web browser without the need for the user to provide second factor authentication data for the subsequent transactions.

6. The computer program product of claim 5, wherein the at least one second factor authentication mode comprises a static personal identification number (PIN) authentication mode, wherein determining the authentication mode is one of the at least one second factor authentication mode comprises determining the authentication mode is the static PIN authentication mode based on the selection of the authentication mode of the plurality of authentication modes, wherein the enrolment request to authenticate the second payment transaction request using the one of the at least one second factor authentication mode comprises a first enrolment request to authenticate the second payment transaction request using the static PIN authentication mode, wherein communicating with the device to receive the second factor authentication data comprises communicating with the device to receive a static PIN, and wherein enrolling the device comprises enrolling the device based on the static PIN.

* * * * *